(12) United States Patent
Mabuchi et al.

(10) Patent No.: US 9,845,385 B2
(45) Date of Patent: Dec. 19, 2017

(54) RUBBER COMPOSITION AND PNEUMATIC TIRE

(75) Inventors: Takahiro Mabuchi, Kobe (JP);
Tatsuhiro Tanaka, Kobe (JP);
Kazuyuki Nishioka, Kobe (JP);
Kenichi Uesaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 203 days.

(21) Appl. No.: 14/007,575

(22) PCT Filed: Apr. 27, 2012

(86) PCT No.: PCT/JP2012/061345
§ 371 (c)(1),
(2), (4) Date: Sep. 25, 2013

(87) PCT Pub. No.: WO2012/147912
PCT Pub. Date: Nov. 1, 2012

(65) Prior Publication Data
US 2014/0011910 A1 Jan. 9, 2014

(30) Foreign Application Priority Data

Apr. 28, 2011 (JP) .................. 2011-102251
May 23, 2011 (JP) .................. 2011-115060
Jun. 6, 2011 (JP) .................. 2011-126500

(51) Int. Cl.
| | |
|---|---|
| *C08L 9/06* | (2006.01) |
| *C08K 3/36* | (2006.01) |
| *C08L 9/00* | (2006.01) |
| *C08L 15/00* | (2006.01) |
| *B60C 1/00* | (2006.01) |
| *C08C 19/44* | (2006.01) |
| *C08F 236/10* | (2006.01) |

(52) U.S. Cl.
CPC .............. *C08L 9/06* (2013.01); *B60C 1/0016* (2013.01); *C08C 19/44* (2013.01); *C08K 3/36* (2013.01); *C08L 9/00* (2013.01); *C08L 15/00* (2013.01); *C08F 236/10* (2013.01); *Y02T 10/862* (2013.01)

(58) Field of Classification Search
CPC ... C08L 15/00; C08L 9/06; C08L 9/00; C08C 19/44; B60C 1/0016; C08F 8/00; C08F 236/10; C08K 3/36; Y02T 10/862
See application file for complete search history.

(56) References Cited

U.S. PATENT DOCUMENTS

| | | |
|---|---|---|
| 3,937,681 A | 2/1976 | Nordsiek |
| 4,836,262 A | 6/1989 | Nishizawa et al. |
| 5,087,668 A | 2/1992 | Standstrom et al. |
| 5,189,109 A | 2/1993 | Imai et al. |
| 6,147,178 A | 11/2000 | Nakamura et al. |
| 6,294,624 B1 | 9/2001 | Inoue et al. |
| 6,590,017 B1 | 7/2003 | Hergenrother et al. |
| 2002/0011293 A1 | 1/2002 | Zanzig et al. |

(Continued)

FOREIGN PATENT DOCUMENTS

| | | |
|---|---|---|
| CN | 1578790 A | 2/2005 |
| CN | 1670062 A | 9/2005 |

(Continued)

OTHER PUBLICATIONS

Standard Test Method for Precipitated Silica-Surface Area by Multipoint BET Nitrogen Adsorption, pp. 1-2, obtained from http://www.astm.org/Standards/D1993.htm.*

(Continued)

*Primary Examiner* — Alexander Kollias
(74) *Attorney, Agent, or Firm* — Birch, Stewart, Kolasch & Birch, LLP

(57) ABSTRACT

The present invention provides a rubber composition that can enhance the fuel economy, wet-grip performance, abrasion resistance, and kneading processability in a balanced manner, and a pneumatic tire using this rubber composition. The present invention relates to a rubber composition that contains a rubber component and silica, wherein the rubber component contains, based on 100% by mass of the rubber component, 10 to 70% by mass of a high-cis polybutadiene having a cis content of 95% by mass or more and satisfying the following requirements (A) to (C): (A) a Mooney viscosity (ML) of 40 to 49; (B) a molecular weight distribution (weight-average molecular weight (Mw)/number-average molecular weight (Mn)) of 3.0 to 3.9; and (C) an index (n-value in Expression (1) below) of velocity dependence of Mooney viscosity of 2.3 to 3.0, and 30 to 90% by mass of a conjugated diene polymer containing a constituent unit based on a conjugated diene and a constituent unit represented by formula (I) below, and an amount of the silica is 5 to 150 parts by mass per 100 parts by mass of the rubber component, $$\log(ML) = \log(K) + n^{-1} \times \log(RS) \quad \text{(Expression 1)}$$

wherein RS indicates the number of revolutions per minute of a rotor, K indicates an arbitrary number, and ML indicates a Mooney viscosity,

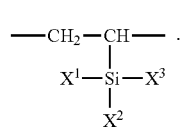
(I)

8 Claims, No Drawings

(56) References Cited

U.S. PATENT DOCUMENTS

| | | |
|---|---|---|
| 2004/0152845 A1 | 8/2004 | Oshima et al. |
| 2004/0254301 A1 | 12/2004 | Tsukimawashi et al. |
| 2005/0119399 A1 | 6/2005 | Nishioka et al. |
| 2005/0209390 A1 | 9/2005 | Yagi et al. |
| 2005/0272852 A1 | 12/2005 | Sandstrom et al. |
| 2006/0173118 A1 | 8/2006 | Hochi et al. |
| 2007/0123636 A1 | 5/2007 | Hattori et al. |
| 2007/0149688 A1 | 6/2007 | Hochi |
| 2007/0167557 A1 | 7/2007 | Dumke et al. |
| 2008/0027166 A1 | 1/2008 | Hochi et al. |
| 2009/0176910 A1* | 7/2009 | Anbe et al. ............... 523/157 |
| 2009/0247692 A1 | 10/2009 | Oshima et al. |
| 2010/0056703 A1 | 3/2010 | Oshima |
| 2010/0056709 A1 | 3/2010 | Oshima |
| 2010/0056710 A1 | 3/2010 | Oshima |
| 2010/0056712 A1 | 3/2010 | Oshima |
| 2010/0056713 A1* | 3/2010 | Oshima .................. 524/572 |
| 2010/0099795 A1 | 4/2010 | Uesaka |
| 2010/0108213 A1 | 5/2010 | Miyazaki |
| 2010/0113683 A1 | 5/2010 | Matsumoto et al. |
| 2010/0144954 A1 | 6/2010 | Kikuchi et al. |
| 2010/0184908 A1 | 7/2010 | Kikuchi et al. |
| 2012/0016056 A1 | 1/2012 | Miyazaki |
| 2012/0149806 A1 | 6/2012 | Kondo et al. |

FOREIGN PATENT DOCUMENTS

| | | | |
|---|---|---|---|
| CN | 1821293 A | | 8/2006 |
| CN | 101360784 A | | 2/2009 |
| CN | 101659728 A | | 3/2010 |
| CN | 101659729 A | | 3/2010 |
| CN | 101659731 A | | 3/2010 |
| CN | 101659732 A | | 3/2010 |
| CN | 101671418 A | | 3/2010 |
| EP | 0042481 A1 | | 12/1981 |
| EP | 0493364 A2 | | 7/1992 |
| EP | 1 075 967 A1 | | 2/2001 |
| EP | 2 062 620 A1 | | 5/2009 |
| EP | 2 098 564 A | | 9/2009 |
| EP | 2196324 A1 | | 6/2010 |
| JP | 1-217047 A | | 8/1989 |
| JP | 4-77536 A | | 3/1992 |
| JP | 5-214170 A | | 8/1993 |
| JP | 2000-344955 A | | 12/2000 |
| JP | 2003-192842 A | | 7/2003 |
| JP | 2003-533574 A | | 11/2003 |
| JP | 2005-213486 A | | 8/2005 |
| JP | 2005-263956 A | | 9/2005 |
| JP | 2006-233177 A | | 9/2006 |
| JP | 2007-177209 A | | 7/2007 |
| JP | 2007-197671 A | | 8/2007 |
| JP | 2008-50570 A | | 3/2008 |
| JP | 2008-101127 A | | 5/2008 |
| JP | 2008-150435 A | | 7/2008 |
| JP | 2008-280438 A | | 11/2008 |
| JP | 2009-91482 A | | 4/2009 |
| JP | 2009-114262 A | | 5/2009 |
| JP | 2009-126907 A | | 6/2009 |
| JP | 2010-77412 A | | 4/2010 |
| JP | 2010-77413 A | | 4/2010 |
| JP | 2010-77414 A | | 4/2010 |
| JP | 2010-77415 A | | 4/2010 |
| JP | 2010-116556 A | | 5/2010 |
| JP | 2010-215832 A | | 9/2010 |
| JP | 2010-270292 A | | 12/2010 |
| WO | WO 2007/081018 A1 | | 7/2007 |

OTHER PUBLICATIONS

United States Final Office Action for copending U.S. Appl. No. 13/700,300 dated Aug. 4, 2014.

United States Final Office Action for copending U.S. Appl. No. 13/700,300 dated Oct. 22, 2014.

United States Office Action for copending U.S. Appl. No. 14/005,781 dated Aug. 29, 2014.

Non-Final Office Action dated Mar. 5, 2015, in U.S. Appl. No. 13/982,160.

International Search Report issued in PCT/JP2012/061345 dated Aug. 7, 2012.

Heisler, "Advanced Vehicle Technology", Elsevier, 2nd edition, 2002, pp. 281-282.

International Search Report for International Application No. PCT/JP2011/066689 dated Aug. 16, 2011.

International Search Report for International Application No. PCT/JP2012/057498 dated Jun. 19, 2012.

International Search Report for International Application No. PCT/JP2012/060342 dated Jul. 17, 2012.

International Search Report for International Application No. PCT/JP2012/060658 dated Jul. 24, 2012.

Machine English translation for JP-2010-77412-A dated Apr. 8, 2010.

United States Office Action for copending U.S. Appl. No. 13/700,300 dated Mar. 20, 2014.

International Search Report (Form PCT/ISA/210) for International Application No. PCT/JP2011/066700, dated Oct. 18, 2011.

U.S. Office Action for U.S. Appl. No. 13/323,426, dated Dec. 24, 2013.

U.S. Office Action for U.S. Appl. No. 13/323,426, dated Mar. 25, 2015.

U.S. Office Action for U.S. Appl. No. 13/323,426, dated May 2, 2014.

U.S. Office Action for U.S. Appl. No. 13/323,426, dated Oct. 27, 2014.

U.S. Office Action for U.S. Appl. No. 13/701,366, dated Mar. 23, 2015.

* cited by examiner

RUBBER COMPOSITION AND PNEUMATIC TIRE

TECHNICAL FIELD

The present invention relates to a rubber composition and a pneumatic tire produced using the rubber composition.

BACKGROUND ART

The demands on automobiles for better fuel economy have been increasing in recent years as concern with environmental issues has been rising. Good fuel economy is also being required of the rubber compositions used for automotive tires.

Patent Literature 1, for example, proposes a method for enhancing the fuel economy. This method uses a diene rubber that has been modified with an organosilicon compound containing an amino group and an alkoxy group. These days, however, further enhancement of the fuel economy has been demanded. Meanwhile, wet-grip performance and abrasion resistance are also properties required of the rubber compositions for automotive tires; however, these properties generally assume an inverse relationship with the fuel economy. Thus, it has been difficult to achieve these properties at high levels in a balanced manner.

Moreover, polybutadiene rubber is generally used to enhance abrasion resistance. The use of butadiene rubber having a higher molecular weight enhances abrasion resistance; however, it unfortunately reduces kneading processability. Thus, a method has been demanded that can enhance fuel economy, wet-grip performance, abrasion resistance, and kneading processability in a balanced manner.

CITATION LIST

Patent Literature

Patent Literature 1: JP 2000-344955 A

SUMMARY OF INVENTION

Technical Problem

An object of the present invention is to solve the problems identified above by providing a rubber composition that provides a well-balanced enhancement of fuel economy, wet-grip performance, abrasion resistance, and kneading processability, and by providing a pneumatic tire produced using the rubber composition.

Solution to Problem

The present invention relates to a rubber composition, including a rubber component and silica,
wherein the rubber component contains, based on 100% by mass of the rubber component,
10 to 70% by mass of a high-cis polybutadiene having a cis content of 95% by mass or greater and satisfying the following requirements (A) to (C): (A) a Mooney viscosity (ML) of 40 to 49; (B) a molecular weight distribution (weight-average molecular weight (Mw)/number-average molecular weight (Mn)) of 3.0 to 3.9; and (C) an index (n-value in Expression (1) below) of velocity dependence of Mooney viscosity of 2.3 to 3.0, and
30 to 90% by mass of a conjugated diene polymer containing a constituent unit based on a conjugated diene and a constituent unit represented by formula (I) below, at least one terminal of the polymer being modified with at least one compound selected from the group consisting of a compound represented by formula (II) below, a compound represented by formula (III) below, and a compound containing a group represented by formula (IV) below, and
an amount of the silica is 5 to 150 parts by mass per 100 parts by mass of the rubber component, $$\log(ML) = \log(K) + n^{-1} \times \log(RS) \quad \text{(Expression 1)}$$

wherein RS indicates the number of revolutions per minute of a rotor, K indicates an arbitrary number, and ML indicates a Mooney viscosity,

wherein $X^1$, $X^2$, and $X^3$ each independently represent a group represented by formula (Ia) below, a hydroxyl group, a hydrocarbyl group, or a substituted hydrocarbyl group, and at least one of $X^1$, $X^2$, and $X^3$ is a hydroxyl group or a group represented by the following formula (Ia):

wherein $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom;

wherein n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-bearing functional group;

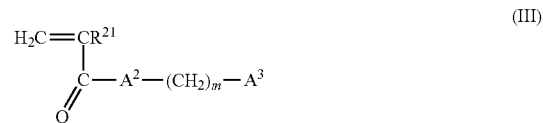

wherein m represents an integer of 1 to 10; $R^{21}$ represents a hydrogen atom, a $C_{1-6}$ hydrocarbyl group, or a $C_{1-6}$ substituted hydrocarbyl group; $A^2$ represents an oxygen atom or the following group: $-NR^{22}-$ where $R^{22}$ represents a hydrogen atom or a $C_{1-10}$ hydrocarbyl group; and $A^3$ represents a functional group bearing at least one of a nitrogen atom and an oxygen atom;

(IV)

wherein p represents an integer of 1 to 11, and $A^4$ represents a nitrogen atom-bearing functional group.

$R^1$ and $R^2$ in formula (Ia) are preferably $C_{1-6}$ hydrocarbyl groups.

Two of $X^1$, $X^2$, and $X^3$ in formula (I) are preferably selected from a group represented by formula (Ia) and a hydroxyl group.

$A^1$ in formula (II) is preferably a group represented by the following formula (IIa):

(IIa)

wherein $R^{14}$ and $R^{15}$ each independently represent a $C_{1-6}$ group optionally containing at least one atom selected from the group consisting of a nitrogen atom, an oxygen atom, and a silicon atom, $R^{14}$ and $R^{15}$ may be bonded to each other to form a cyclic structure together with the nitrogen atom, and $R^{14}$ and $R^{15}$ may form a single group bonded to the nitrogen via a double bond.

$A^3$ in formula (III) is preferably a hydroxyl group or a group represented by the following formula (IIIa):

(IIIa)

wherein $R^{23}$ and $R^{24}$ each independently represent a $C_{1-6}$ group optionally containing at least one atom selected from the group consisting of a nitrogen atom, an oxygen atom, and a silicon atom, $R^{23}$ and $R^{24}$ may be bonded to each other to form a cyclic structure together with the nitrogen atom, and $R^{23}$ and $R^{24}$ may form a single group bonded to the nitrogen via a double bond.

The compound containing a group represented by formula (IV) is preferably a compound represented by the following formula (IVa):

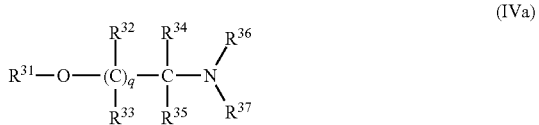

(IVa)

wherein q represents an integer of 0 to 10; $R^{31}$ represents a $C_{1-5}$ hydrocarbyl group; $R^{32}$, $R^{33}$, $R^{34}$ and $R^{35}$ each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^{32}$'s and a plurality of $R^{33}$'s are present, the plurality of $R^{32}$'s and the plurality of $R^{33}$'s may be the same as or different from one another; and $R^{36}$ and $R^{37}$ each independently represent a $C_{1-6}$ group optionally containing at least one atom selected from the group consisting of a nitrogen atom, an oxygen atom, and a silicon atom, $R^{36}$ and $R^{37}$ may be bonded to each other to form a cyclic structure together with the nitrogen atom, and $R^{36}$ and $R^{37}$ may form a single group bonded to the nitrogen via a double bond.

Preferably, one of $R^{34}$ and $R^{35}$ in formula (IVa) is a hydrogen atom.

The conjugated diene polymer preferably has a vinyl bond content of at least 10 mol % but not more than 80 mol % per 100 mol % of the constituent unit based on a conjugated diene.

The high-cis polybutadiene preferably has a ratio (Tcp/ML) of a 5% by mass toluene solution viscosity (Tcp) to the Mooney viscosity (ML) of 2.5 to 3.5.

The high-cis polybutadiene preferably has a Mw of 500,000 to 700,000 and a Mn of 120,000 to 250,000.

The silica preferably has a nitrogen adsorption specific surface area of 40 to 400 m²/g.

The rubber composition is preferably for use as a rubber composition for a tread.

The present invention also relates to a pneumatic tire, produced using the foregoing rubber composition.

Advantageous Effects of Invention

The present invention relates to a rubber composition that includes a specific amount of silica and a rubber component containing a specific amount of a specific high-cis polybutadiene and a specific amount of a specific conjugated diene polymer. Thus, the present invention can provide a pneumatic tire that is improved in the fuel economy, wet-grip performance, abrasion resistance, and kneading processability in a balanced manner.

DESCRIPTION OF EMBODIMENTS

The rubber composition of the present invention contains a rubber component and a specific amount of silica, the rubber component containing a specific amount of a high-cis polybutadiene having a cis content of 95% by mass or more and satisfying the following requirements (A) to (C): (A) a Mooney viscosity (ML) of 40 to 49; (B) a molecular weight distribution (weight-average molecular weight (Mw)/number-average molecular weight (Mn)) of 3.0 to 3.9; and (C) an index (n-value in Expression (1) below) of velocity dependence of Mooney viscosity of 2.3 to 3.0, and a specific amount of a conjugated diene polymer containing a constituent unit based on a conjugated diene and a constituent unit represented by formula (I) below, at least one terminal of the polymer being modified with at least one compound selected from the group consisting of a compound represented by formula (II) below, a compound represented by formula (III) below, and a compound containing a group represented by formula (IV) below, $\log(ML)=\log(K)+n^{-1}\times\log(RS)$ (Expression 1)

wherein RS indicates the number of revolutions per minute of a rotor, K indicates an arbitrary number, and ML indicates a Mooney viscosity,

(I)

wherein $X^1$, $X^2$, and $X^3$ each independently represent a group represented by formula (Ia) below, a hydroxyl group, a hydrocarbyl group, or a substituted hydrocarbyl group, and at least one of $X^1$, $X^2$, and $X^3$ is a hydroxyl group or a group represented by the following formula (Ia):

(Ia)

wherein $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom;

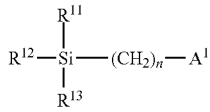
(II)

wherein n represents an integer of 1 to 10; $R^{11}$, $R^{12}$, and $R^{13}$ each independently represent a $C_{1-4}$ hydrocarbyl group or a hydrocarbyloxy group, and at least one of $R^{11}$, $R^{12}$, and $R^{13}$ is a hydrocarbyloxy group; and $A^1$ represents a nitrogen atom-bearing functional group;

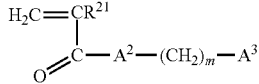
(III)

wherein m represents an integer of 1 to 10; $R^{21}$ represents a hydrogen atom, a $C_{1-6}$ hydrocarbyl group, or a $C_{1-6}$ substituted hydrocarbyl group; $A^2$ represents an oxygen atom or the following group: —$NR^{22}$— where $R^{22}$ represents a hydrogen atom or a $C_{1-10}$ hydrocarbyl group; and $A^3$ represents a functional group bearing at least one of a nitrogen atom and an oxygen atom;

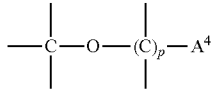
(IV)

wherein p represents an integer of 1 to 11, and $A^4$ represents a nitrogen atom-bearing functional group.

The aforementioned conjugated diene polymer has modified groups in the main chain and terminal, and has a strong interaction with silica. Thus, silica is favorably dispersed. Consequently, the fuel economy, wet-grip performance, and abrasion resistance, in particular wet-grip performance and fuel economy, can be enhanced. However, the kneading processability may be reduced in some cases, as compared with rubber containing no modified groups.

The aforementioned high-cis butadiene favorably mixes with silica at an early stage of kneading, exhibiting good kneading processability and better abrasion resistance.

Unfortunately, however, the wet-grip performance is not enhanced in some cases. For example, an effect of enhancing the wet-grip performance is not sufficiently achieved when a rubber composition containing silica contains the high-cis polybutadiene in combination with an unmodified styrenebutadiene rubber, styrenebutadiene rubber modified only at the terminal, or styrenebutadiene rubber modified only at the main chain.

In contrast, according to the present invention, a rubber composition containing silica contains the high-cis polybutadiene in combination with the conjugated diene polymer. Thus, the fuel economy, wet-grip performance, and abrasion resistance can be synergically enhanced so that the fuel economy, wet-grip performance, abrasion resistance, and kneading processability can be achieved at high levels in a balanced manner.

The conjugated diene for the conjugated diene-based constituent unit can be exemplified by 1,3-butadiene, isoprene, 1,3-pentadiene, 2,3-dimethyl-1,3-butadiene, and 1,3-hexadiene, and one, or two or more of these may be used. Preferred are 1,3-butadiene and isoprene, in view of ease of availability.

$X^1$, $X^2$, and $X^3$ in formula (I) of the constituent unit represented by formula (I) each independently represent a group represented by formula (Ia), a hydroxyl group, a hydrocarbyl group, or a substituted hydrocarbyl group, and at least one of $X^1$, $X^2$, and $X^3$ is a group represented by formula (Ia) or a hydroxyl group.

$R^1$ and $R^2$ in formula (Ia) each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom.

As used herein, the term "hydrocarbyl group" denotes a monovalent hydrocarbon residue. This hydrocarbon residue refers to a group obtained by removing hydrogen from a hydrocarbon. The term "substituted hydrocarbyl group" denotes a group obtained by substituting one or more hydrogen atoms of a monovalent hydrocarbon residue by substituent groups. The term "hydrocarbyloxy group" denotes a group obtained by substituting the hydrogen atom of a hydroxyl group by a hydrocarbyl group. The term "substituted hydrocarbyloxy group" denotes a group obtained by substituting one or more hydrogen atoms of a hydrocarbyloxy group by substituent groups. The term "hydrocarbylene group" denotes a divalent hydrocarbon residue. The term "substituted hydrocarbylene group" denotes a group obtained by substituting one or more hydrogen atoms of a divalent hydrocarbon residue by substituent groups. The term "substituted silyl group" denotes a group obtained by substituting one or more hydrogen atoms of a silyl group by substituent groups.

The $C_{1-6}$ hydrocarbyl groups encompassed by $R^1$ and $R^2$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The $C_{1-6}$ substituted hydrocarbyl groups encompassed by $R^1$ and $R^2$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups. The groups containing a silicon atom-bearing group as a substituent can be exemplified by trialkylsilylalkyl groups such as a trimethylsilylmethyl group.

The substituted silyl groups encompassed by $R^1$ and $R^2$ can be exemplified by trialkylsilyl groups such as trimethylsilyl, triethylsilyl, and t-butyldimethylsilyl groups.

The groups in which $R^1$ and $R^2$ are bonded to each other can be exemplified by $C_{1-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

The group in which $R^1$ and $R^2$ are bonded to each other is preferably a nitrogenous group, and more preferably a group represented by —$CH_2CH_2$—NH—$CH_2$— or a group represented by —$CH_2CH_2$—N=CH—.

The hydrocarbyl group encompassed by $R^1$ and $R^2$ is preferably an alkyl group, more preferably a $C_{1-4}$ alkyl group, further preferably a methyl group, an ethyl group, an n-propyl group, or an n-butyl group, and particularly preferably an ethyl group or an n-butyl group. The substituted hydrocarbyl group encompassed by $R^1$ and $R^2$ is preferably an alkoxyalkyl group, and more preferably a $C_{1-4}$ alkoxyalkyl group. The substituted silyl group encompassed by $R^1$ and $R^2$ is preferably a trialkylsilyl group, and more preferably a trimethylsilyl group.

Preferably, $R^1$ and $R^2$ are a nitrogenous group in which $R^1$ and $R^2$ are bonded to each other, or are each independently an alkyl group, an alkoxyalkyl group, or a substituted silyl group, more preferably an alkyl group, still more preferably a $C_{1-4}$ alkyl group, and particularly preferably a methyl group, an ethyl group, an n-propyl group, or an n-butyl group.

The group represented by formula (Ia) may be an acyclic amino group or a cyclic amino group.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl) amino, and ethylmethylamino groups; di(alkoxyalkyl)amino groups such as di(methoxymethyl)amino, di(methoxyethyl) amino, di(ethoxymethyl)amino, and di(ethoxyethyl)amino groups; and di(trialkylsilyl)amino groups such as di(trimethylsilyl)amino and di(t-butyldimethylsilyl)amino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of economic efficiency and ease of availability, the group represented by formula (Ia) is preferably an acyclic amino group, more preferably a dialkylamino group, still more preferably a dialkylamino group which contains a $C_{1-4}$ alkyl group as a substituent, and particularly preferably a dimethylamino group, a diethylamino group, a di(n-propyl)amino group, or a di(n-butyl)amino group.

The hydrocarbyl groups encompassed by $X^1$, $X^2$, and $X^3$ in formula (I) can be exemplified by alkyl groups such as methyl, ethyl, n-propyl, isopropyl, n-butyl, sec-butyl, and tert-butyl groups. The substituted hydrocarbyl groups can be exemplified by alkoxyalkyl groups such as methoxymethyl, ethoxymethyl, methoxyethyl, and ethoxyethyl groups.

The hydrocarbyl group encompassed by $X^1$, $X^2$, and $X^3$ is preferably an alkyl group, more preferably a $C_{1-4}$ alkyl group, and still more preferably a methyl group or an ethyl group. The substituted hydrocarbyl group encompassed by $X^1$, $X^2$, and $X^3$ is preferably an alkoxyalkyl group, and more preferably a $C_{1-4}$ alkoxyalkyl group.

The hydrocarbyl group or substituted hydrocarbyl group encompassed by $X^1$, $X^2$, and $X^3$ is preferably an alkyl group or an alkoxyalkyl group, more preferably a $C_{1-4}$ alkyl group or a $C_{1-4}$ alkoxyalkyl group, still more preferably a $C_{1-4}$ alkyl group, and further preferably a methyl group or an ethyl group.

At least one of $X^1$, $X^2$, and $X^3$ in formula (I) is a hydroxyl group or a group represented by formula (Ia). Preferably at least two of $X^1$, $X^2$, and $X^3$ are each a hydroxyl group or a group represented by formula (Ia), and more preferably two of $X^1$, $X^2$, and $X^3$ are each a hydroxyl group or a group represented by formula (Ia). In view of achieving the fuel economy, wet-grip performance, abrasion resistance, and kneading processability at high levels in a balanced manner, preferably at least one of $X^1$, $X^2$, and $X^3$ is a hydroxyl group, more preferably at least two of $X^1$, $X^2$, and $X^3$ are hydroxyl groups, and still more preferably two of $X^1$, $X^2$, and $X^3$ are hydroxyl groups.

In view of enhancing the fuel economy, wet-grip performance, abrasion resistance, and kneading processability in a balanced manner, the constituent unit represented by formula (I) is preferably a constituent unit in which two of $X^1$, $X^2$, and $X^3$ are, independently, an acyclic amino group or a hydroxyl group. The constituent unit in which two of $X^1$, $X^2$, and $X^3$ are acyclic amino groups is preferably a bis(dialkylamino)alkylvinylsilane unit and is more preferably a bis(dimethylamino)methylvinylsilane unit, bis(diethylamino) methylvinylsilane unit, bis(di(n-propyl)amino) methylvinylsilane unit, or bis(di(n-butyl)amino) methylvinylsilane unit. The constituent unit in which two of $X^1$, $X^2$, and $X^3$ are hydroxyl groups is preferably a dihydroxyalkylvinylsilane unit, and more preferably a dihydroxymethylvinylsilane unit.

In view of enhancing the fuel economy, wet-grip performance, abrasion resistance, and kneading processability in a balanced manner, the content of the constituent unit represented by formula (I) in the conjugated diene polymer, expressed per unit mass of the polymer, is preferably at least 0.001 mmol/g-polymer but not more than 0.1 mmol/g-polymer, more preferably at least 0.002 mmol/g-polymer but not more than 0.07 mmol/g-polymer, and even more preferably at least 0.003 mmol/g-polymer but not more than 0.05 mmol/g-polymer.

At least one terminal of the conjugated diene polymer is modified with a specific compound (modifying agent 1, 2 or 3). This causes interaction with silica, thereby enhancing the fuel economy, wet-grip performance, and abrasion resistance in a balanced manner.

The following explains the compound (modifying agent 1) represented by formula (II) below.

In the formula, n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-bearing functional group.

$R^{11}$, $R^{12}$, and $R^{13}$ in formula (II) each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group.

The hydrocarbyl groups encompassed by $R^{11}$, $R^{12}$, and $R^{13}$ can be exemplified by alkyl groups such as methyl, ethyl, n-propyl, isopropyl, n-butyl, sec-butyl, and tert-butyl groups. The hydrocarbyloxy groups encompassed by $R^{11}$, $R^{12}$ and $R^{13}$ can be exemplified by alkoxy groups such as methoxy, ethoxy, n-propoxy, isopropoxy, n-butoxy, sec-butoxy, and t-butoxy groups.

The hydrocarbyl group encompassed by $R^{11}$, $R^{12}$, and $R^{13}$ is preferably an alkyl group, more preferably a $C_{1-3}$ alkyl group, and still more preferably a methyl group or an ethyl group. The hydrocarbyloxy group encompassed by $R^{11}$, $R^{12}$, and $R^{13}$ is preferably an alkoxy group, more preferably a $C_{1-3}$ alkoxy group, and still more preferably a methoxy group or an ethoxy group.

In view of enhancing the fuel economy, wet-grip performance, abrasion resistance, and kneading processability in a balanced manner, preferably at least two of $R^{11}$, $R^{12}$, and $R^{13}$ are hydrocarbyloxy groups, and more preferably the three of $R^{11}$, $R^{12}$, and $R^{13}$ are hydrocarbyloxy groups.

In formula (II), n represents an integer of 1 to 10. In view of enhancing the fuel economy, wet-grip performance, abrasion resistance, and kneading processability in a balanced manner, n is preferably not less than 3. In view of enhancing the economic efficiency, n is preferably not more than 4. Particularly preferably, n is 3.

$A^1$ in formula (II) is a nitrogen atom-bearing functional group and examples thereof include amino, isocyano, cyano, pyridyl, piperidyl, pyrazinyl, and morpholino groups.

$A^1$ is preferably a group represented by the following formula (IIa).

(IIa)

In the formula, $R^{14}$ and $R^{15}$ each independently represent a $C_{1-6}$ group optionally containing at least one atom selected from the group consisting of a nitrogen atom, an oxygen atom, and a silicon atom, $R^{14}$ and $R^{15}$ may be bonded to each other to form a cyclic structure together with the nitrogen atom, and $R^{14}$ and $R^{15}$ may form a single group bonded to the nitrogen via a double bond.

Examples of $R^{14}$ and $R^{15}$ in formula (IIa) include $C_{1-6}$ hydrocarbyl groups, $C_{1-6}$ substituted hydrocarbyl groups, and substituted silyl groups.

The hydrocarbyl groups encompassed by $R^{14}$ and $R^{15}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{14}$ and $R^{15}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-bearing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by substituting at least one hydrogen atom of an alkyl group by an alkylene oxide group.

The substituted silyl groups encompassed by $R^{14}$ and $R^{15}$ can be exemplified by trialkylsilyl groups such as trimethylsilyl, triethylsilyl, and t-butyldimethylsilyl groups, and trialkoxysilyl groups such as a trimethoxysilyl group.

The groups in which $R^{14}$ and $R^{15}$ are bonded to each other can be exemplified by $C_{2-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

The group in which $R^{14}$ and $R^{15}$ are bonded to each other is preferably a nitrogenous group, and more preferably a group represented by —$CH_2CH_2$—NH—$CH_2$— or a group represented by —$CH_2CH_2$—N=CH—.

Examples of the single group bonded to the nitrogen via a double bond, formed by $R^{14}$ and $R^{15}$, include $C_{2-12}$ divalent groups optionally containing at least one atom selected from the group consisting of a nitrogen atom, an oxygen atom, and a silicon atom. Specific examples thereof include an ethylidene group, a 1-methylpropylidene group, a 1,3-dimethylbutylidene group, a 1-methylethylidene group, and a 4-N,N-dimethylaminobenzylidene group.

The hydrocarbyl group encompassed by $R^{14}$ and $R^{15}$ is preferably an alkyl group, more preferably a $C_{1-4}$ alkyl group, still more preferably a methyl group, an ethyl group, an n-propyl group, or an n-butyl group, and particularly preferably a methyl group or an ethyl group. The substituted hydrocarbyl group encompassed by $R^{14}$ and $R^{15}$ is preferably an alkoxyalkyl group, an alkylene oxide group, or an alkylene oxide alkyl group. The substituted silyl group encompassed by $R^{14}$ and $R^{15}$ is preferably a trialkylsilyl group or a trialkoxysilyl group, more preferably a trialkylsilyl group, and still more preferably a trimethylsilyl group or a triethylsilyl group.

Preferably, $R^{14}$ and $R^{15}$ are a nitrogenous group in which $R^{14}$ and $R^{15}$ are bonded to each other, or are each independently an alkyl group, an alkoxyalkyl group, an alkylene oxide group, an alkylene oxide alkyl group, or a substituted silyl group, more preferably an alkyl group, an alkylene oxide group, an alkylene oxide alkyl group, or a trialkylsilyl group.

The groups represented by formula (IIa) can be exemplified by acyclic amino groups and cyclic amino groups.

Examples of the acyclic amino groups include dialkylamino groups such as dimethylamino, diethylamino, di(n- propyl)amino, di(isopropyl)amino, di(n-butyl)amino, di(sec-butyl)amino, di(tert-butyl)amino, di(neopentyl) amino, and ethylmethylamino groups; di(alkoxyalkyl)amino groups such as di(methoxymethyl)amino, di(methoxyethyl) amino, di(ethoxymethyl)amino, and di(ethoxyethyl)amino groups; and di(trialkylsilyl)amino groups such as di(trimethylsilyl)amino and di(t-butyldimethylsilyl)amino groups. Other examples include di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Additional examples include ethylideneamino, 1-methylpropylideneamino, 1,3-dimethylbutylideneamino, 1-methylethylideneamino, and 4-N,N-dimethylaminobenzylideneamino groups.

As used herein, the term "di(alkylene oxide)amino group" denotes an amino group in which two hydrogen atoms bonded to the nitrogen atom are substituted by two alkylene oxide groups. The term "di(alkylene oxide alkyl)amino group" denotes an amino group in which two hydrogen atoms bonded to the nitrogen atom are substituted by two alkylene oxide alkyl groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, abrasion resistance, kneading processability, and long-term stability and easy availability of the compound, the group represented by formula (IIa) is preferably an acyclic amino group, and more preferably a dialkylamino group, a di(alkylene oxide)amino group, a di(alkylene oxide alkyl)amino group, or a di(trialkylsilyl)amino group.

The compounds represented by formula (II) can be exemplified by compounds in which formula (IIa) is an acyclic amino group such as a dialkylamino group, a di(alkoxyalkyl)amino group, a di(alkylene oxide)amino group, a di(alkylene oxide alkyl)amino group, or a trialkylsilyl group.

The compounds in which formula (IIa) is a dialkylamino group can be exemplified by the following: [3-(dialkylamino)propyl]trialkoxysilanes such as
[3-(dimethylamino)propyl]trimethoxysilane,
[3-(diethylamino)propyl]trimethoxysilane,
[3-(ethylmethylamino)propyl]trimethoxysilane,
[3-(dimethylamino)propyl]triethoxysilane,
[3-(diethylamino)propyl]triethoxysilane, and
[3-(ethylmethylamino)propyl]triethoxysilane;
[3-(dialkylamino)propyl]alkyldialkoxysilanes such as
[3-(dimethylamino)propyl]methyldimethoxysilane,
[3-(diethylamino)propyl]methyldimethoxysilane,
[3-(ethylmethylamino)propyl]methyldimethoxysilane,
[3-(dimethylamino)propyl]ethyldimethoxysilane,
[3-(diethylamino)propyl]ethyldimethoxysilane,
[3-(ethylmethylamino)propyl]ethyldimethoxysilane,
[3-(dimethylamino)propyl]methyldiethoxysilane,
[3-(diethylamino)propyl]methyldiethoxysilane,
[3-(ethylmethylamino)propyl]methyldiethoxysilane,
[3-(dimethylamino)propyl]ethyldiethoxysilane,
[3-(diethylamino)propyl]ethyldiethoxysilane, and
[3-(ethylmethylamino)propyl]ethyldiethoxysilane; and
[3-(dialkylamino)propyl]dialkylalkoxysilanes such as
[3-(dimethylamino)propyl]dimethylmethoxysilane,
[3-(diethylamino)propyl]dimethylmethoxysilane,
[3-(dimethylamino)propyl]diethylmethoxysilane,
[3-(diethylamino)propyl]diethylmethoxysilane,
[3-(dimethylamino)propyl]dimethylethoxysilane,
[3-(diethylamino)propyl]dimethylethoxysilane,
[3-(dimethylamino)propyl]diethylethoxysilane, and
[3-(diethylamino)propyl]diethylethoxysilane.

The compounds in which formula (IIa) is a di(alkoxyalkyl)amino group can be exemplified by the following:
{3-[di(alkoxyalkyl)amino]propyl}trialkoxysilanes such as
{3-[di(methoxymethyl)amino]propyl}trimethoxysilane,
{3-[di(ethoxymethyl)amino]propyl}trimethoxysilane,
{3-[di(methoxyethyl)amino]propyl}trimethoxysilane,
{3-[di(ethoxyethyl)amino]propyl}trimethoxysilane,
{3-[di(methoxymethyl)amino]propyl}triethoxysilane,
{3-[di(ethoxymethyl)amino]propyl}triethoxysilane,
{3-[di(methoxyethyl)amino]propyl}triethoxysilane, and
{3-[di(ethoxyethyl)amino]propyl}triethoxysilane;
{3-[di(alkoxyalkyl)amino]propyl}alkyldialkoxysilanes such as
{3-[di(methoxymethyl)amino]propyl}methyldimethoxysilane,
{3-[di(ethoxymethyl)amino]propyl}methyldimethoxysilane,
{3-[di(methoxyethyl)amino]propyl}methyldimethoxysilane,
{3-[di(ethoxyethyl)amino]propyl}methyldimethoxysilane,
{3-[di(methoxymethyl)amino]propyl}ethyldimethoxysilane,
{3-[di(ethoxymethyl)amino]propyl}ethyldimethoxysilane,
{3-[di(methoxyethyl)amino]propyl}ethyldimethoxysilane,
{3-[di(ethoxyethyl)amino]propyl}ethyldimethoxysilane,
{3-[di(methoxymethyl)amino]propyl}methyldiethoxysilane,
{3-[di(ethoxymethyl)amino]propyl}methyldiethoxysilane,
{3-[di(methoxyethyl)amino]propyl}methyldiethoxysilane,
{3-[di(ethoxyethyl)amino]propyl}methyldiethoxysilane,
{3-[di(methoxymethyl)amino]propyl}ethyldiethoxysilane,
{3-[di(ethoxymethyl)amino]propyl}ethyldiethoxysilane,
{3-[di(methoxyethyl)amino]propyl}ethyldiethoxysilane,
and
{3-[di(ethoxyethyl)amino]propyl}ethyldiethoxysilane; and
{3-[di(alkoxyalkyl)amino]propyl}dialkylalkoxysilanes such as
{3-[di(methoxymethyl)amino]propyl}dimethylmethoxysilane,
{3-[di(ethoxymethyl)amino]propyl}dimethylmethoxysilane,
{3-[di(methoxyethyl)amino]propyl}dimethylmethoxysilane,
{3-[di(ethoxyethyl)amino]propyl}dimethylmethoxysilane,
{3-[di(methoxymethyl)amino]propyl}diethylmethoxysilane,
{3-[di(ethoxymethyl)amino]propyl}diethylmethoxysilane,
{3-[di(methoxyethyl)amino]propyl}diethylmethoxysilane,
{3-[di(ethoxyethyl)amino]propyl}diethylmethoxysilane,
{3-[di(methoxymethyl)amino]propyl}dimethylethoxysilane,
{3-[di(ethoxymethyl)amino]propyl}dimethylethoxysilane,
{3-[di(methoxyethyl)amino]propyl}dimethylethoxysilane,
{3-[di(ethoxyethyl)amino]propyl}dimethylethoxysilane,
{3-[di(methoxymethyl)amino]propyl}diethylethoxysilane,
{3-[di(ethoxymethyl)amino]propyl}diethylethoxysilane,
{3-[di(methoxyethyl)amino]propyl}diethylethoxysilane,
and
{3-[di(ethoxyethyl)amino]propyl}diethylethoxysilane.

The compounds in which formula (IIa) is a di(alkylene oxide)amino group can be exemplified by compounds in which formula (IIa) is a di(epoxy)amino group, such as
{3-[di(epoxy)amino]propyl}trimethoxysilane,
{3-[di(epoxy)amino]propyl}triethoxysilane,
{3-[di(epoxy)amino]propyl}methyldimethoxysilane,
{3-[di(epoxy)amino]propyl}ethyldimethoxysilane,
{3-[di(epoxy)amino]propyl}methyldiethoxysilane,
{3-[di(epoxy)amino]propyl}ethyldiethoxysilane,
{3-[di(epoxy)amino]propyl}dimethylmethoxysilane,
{3-[di(epoxy)amino]propyl}diethylmethoxysilane,
{3-[di(epoxy)amino]propyl}dimethylethoxysilane, and
{3-[di(epoxy)amino]propyl}diethylethoxysilane; and
compounds in which formula (IIa) is a di(tetrahydrofuranyl)amino group, such as
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}-methyldimethoxysilane,
{3-[di(tetrahydrofuranyl)amino]propyl}-ethyldimethoxysilane,
{3-[di(tetrahydrofuranyl)amino]propyl}-methyldiethoxysilane,
{3-[di(tetrahydrofuranyl)amino]propyl}-ethyldiethoxysilane,
{3-[di(tetrahydrofuranyl)amino]propyl}-dimethylmethoxysilane,
{3-[di(tetrahydrofuranyl)amino]propyl}-diethylmethoxysilane,
{3-[di(tetrahydrofuranyl)amino]propyl}-dimethylethoxysilane, and
{3-[di(tetrahydrofuranyl)amino]propyl}-diethylethoxysilane.

The compounds in which formula (IIa) is a di(alkylene oxide alkylamino group can be exemplified by compounds in which formula (IIa) is a di(glycidyl)amino group, such as
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane; and
compounds in which formula (IIa) is a di(tetrahydrofurfuryl)amino group, such as
{3-[di(tetrahydrofurfuryl)amino]propyl}trimethoxysilane,
{3-[di(tetrahydrofurfuryl)amino]propyl}triethoxysilane,
{3-[di(tetrahydrofurfuryl)amino]propyl}-methyldimethoxysilane,
{3-[di(tetrahydrofurfuryl)amino]propyl}-ethyldimethoxysilane,
{3-[di(tetrahydrofurfuryl)amino]propyl}-methyldiethoxysilane,
{3-[di(tetrahydrofurfuryl)amino]propyl}-ethyldiethoxysilane,
{3-[di(tetrahydrofurfuryl)amino]propyl}-dimethylmethoxysilane,
{3-[di(tetrahydrofurfuryl)amino]propyl}-diethylmethoxysilane,
{3-[di(tetrahydrofurfuryl)amino]propyl}-dimethylethoxysilane, and
{3-[di(tetrahydrofurfuryl)amino]propyl}-diethylethoxysilane.

The compounds in which formula (IIa) is a trialkylsilyl group can be exemplified by the following:
{3-[di(trialkylsilyl)amino]propyl}trialkoxysilanes such as
{3-[di(trimethylsilyl)amino]propyl}trimethoxysilane,
{3-[di(t-butyldimethylsilyl)amino]propyl}-trimethoxysilane,
{3-[di(trimethylsilyl)amino]propyl}triethoxysilane, and
{3-[di(t-butyldimethylsilyl)amino]propyl}-triethoxysilane;
{3-[di(trialkylsilyl)amino]propyl}alkyldialkoxysilanes such as
{3-[di(trimethylsilyl)amino]propyl}methyldimethoxysilane,
{3-[di(t-butyldimethylsilyl)amino]propyl}-methyldimethoxysilane,
{3-[di(trimethylsilyl)amino]propyl}methyldiethoxysilane, and
{3-[di(t-butyldimethylsilyl)amino]propyl}-methyldiethoxysilane; and
{3-[di(trialkylsilyl)amino]propyl}dialkylalkoxysilanes such as
{3-[di(trimethylsilyl)amino]propyl}dimethylmethoxysilane,
{3-[di(t-butyldimethylsilyl)amino]propyl}-dimethylmethoxysilane,
{3-[di(trimethylsilyl)amino]propyl}dimethylethoxysilane, and
{3-[di(t-butyldimethylsilyl)amino]propyl}-dimethylethoxysilane.

Preferred among the preceding are [3-(dialkylamino)propyl]trialkoxysilanes, and more preferred are [3-(dimethylamino)propyl]trimethoxysilane,
[3-(diethylamino)propyl]trimethoxysilane,
[3-(dimethylamino)propyl]triethoxysilane, and
[3-(diethylamino)propyl]triethoxysilane.

The compounds represented by formula (II) can also be exemplified by compounds in which formula (IIa) is a cyclic amino group such as a 1-piperidino group, a 1-hexamethyleneimino group, a 1-imidazolyl group, a 4,5-dihydro-1-imidazolyl group, a 1-piperazinyl group, or a morpholino group.

The compounds in which formula (IIa) is a 1-piperidino group can be exemplified by
3-(1-piperidino)propyltrimethoxysilane,
3-(1-piperidino)propyltriethoxysilane,
3-(1-piperidino)propylmethyldimethoxysilane,
3-(1-piperidino)propylethyldimethoxysilane,
3-(1-piperidino)propylmethyldiethoxysilane, and
3-(1-piperidino)propylethyldiethoxysilane.

The compounds in which formula (IIa) is a 1-hexamethyleneimino group can be exemplified by
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexamethyleneimino)propylmethyldiethoxysilane, and
3-(1-hexamethyleneimino)propylethyldiethoxysilane.

The compounds in which formula (IIa) is a 1-imidazolyl group can be exemplified by
N-(3-trimethoxysilylpropyl)imidazole and
N-(3-triethoxysilylpropyl)imidazole.

The compounds in which formula (IIa) is a 4,5-dihydro-1-imidazolyl group can be exemplified by
N-(3-trimethoxysilylpropyl)-4,5-dihydroimidazole and
N-(3-triethoxysilylpropyl)-4,5-dihydroimidazole.

The compounds in which formula (IIa) is a 1-piperazinyl group can be exemplified by 3-(1-piperazinyl)propyltrimethoxysilane,
3-(1-piperazinyl)propyltriethoxysilane,
3-(1-piperazinyl)propylmethyldimethoxysilane,
3-(1-piperazinyl)propylethyldimethoxysilane,
3-(1-piperazinyl)propylmethyldiethoxysilane, and
3-(1-piperazinyl)propylethyldiethoxysilane.

The compounds in which formula (IIa) is a morpholino group can be exemplified by
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethyldiethoxysilane.

Among the preceding, compounds in which formula (IIa) is a 1-imidazolyl group and compounds in which formula (IIa) is a 4,5-dihydro-1-imidazolyl group are preferred, and
N-(3-trimethoxysilylpropyl)imidazole,
N-(3-triethoxysilylpropyl)imidazole,
N-(3-trimethoxysilylpropyl)-4,5-dihydroimidazole, and
N-(3-triethoxysilylpropyl)-4,5-dihydroimidazole are more preferred.

The following explains the compound (modifying agent 2) represented by formula (III) below.

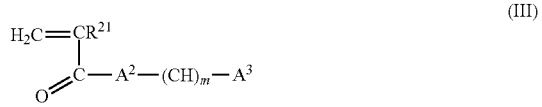

(III)

In the formula, m represents an integer of 1 to 10; $R^{21}$ represents a hydrogen atom, a $C_{1-6}$ hydrocarbyl group, or a $C_{1-6}$ substituted hydrocarbyl group; $A^2$ represents an oxygen atom or the following group: —$NR^{22}$— where $R^{22}$ represents a hydrogen atom or a $C_{1-10}$ hydrocarbyl group; and $A^3$ represents a functional group bearing a nitrogen atom and/or an oxygen atom.

Here, m represents an integer of 1 to 10. In view of enhancing the fuel economy, wet-grip performance, abrasion resistance, and kneading processability in a balanced manner, m is preferably not less than 2. In view of enhancing the economic efficiency of the production, m is more preferably not more than 4. Still more preferably, m is 3.

$R^{21}$ in formula (III) represents a hydrogen atom, a $C_{1-6}$ hydrocarbyl group, or a $C_{1-6}$ substituted hydrocarbyl group.

The hydrocarbyl groups encompassed by $R^{21}$ can be exemplified by alkyl groups such as methyl, ethyl, n-propyl, isopropyl, n-butyl, sec-butyl, and t-butyl groups.

The substituted hydrocarbyl groups encompassed by $R^{21}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups. The groups containing a silicon atom-bearing group as a substituent can be exemplified by trialkylsilylalkyl groups such as a trimethylsilylmethyl group; trialkylsilyloxyalkyl groups such as a t-butyldimethylsilyloxymethyl group; and trialkoxysilylalkyl groups such as a trimethoxysilylpropyl group.

The hydrocarbyl group encompassed by $R^{21}$ is preferably an alkyl group, more preferably a $C_{1-4}$ alkyl group, still more preferably a methyl group or an ethyl group, and further preferably a methyl group. The substituted hydrocarbyl group encompassed by $R^{21}$ is preferably an alkoxyalkyl group, more preferably a $C_{1-4}$ alkoxyalkyl group, still more preferably a methoxymethyl or an ethoxyethyl group, and particularly preferably a methoxymethyl group.

In view of economic efficiency and in view of enhancing the fuel economy, wet-grip performance, abrasion resistance, and kneading processability in a balanced manner, $R^{21}$ is preferably a hydrogen atom, an alkyl group, or an alkoxyalkyl group, more preferably a hydrogen atom, a $C_{1-4}$ alkyl group, or a $C_{1-4}$ alkoxyalkyl group, still more preferably a hydrogen atom, a methyl group, or a methoxymethyl group, and particularly preferably a hydrogen atom or a methyl group.

$A^2$ in formula (III) represents an oxygen atom or the following group: —$NR^{22}$— where $R^{22}$ represents a hydrogen atom or a $C_{1-10}$ hydrocarbyl group.

The hydrocarbyl groups encompassed by $R^{22}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The hydrocarbyl group encompassed by $R^{22}$ is preferably an alkyl group, more preferably a $C_{1-4}$ alkyl group, and still more preferably a methyl group or an ethyl group.

$R^{22}$ is preferably a hydrogen atom or an alkyl group, more preferably a hydrogen atom or a $C_{1-4}$ alkyl group, still more preferably a hydrogen atom, a methyl group or an ethyl group, and particularly preferably a hydrogen atom or a methyl group.

$A^3$ in formula (III) represents a functional group bearing a nitrogen atom and/or an oxygen atom. Examples of the nitrogen atom-bearing functional group include amino, isocyano, cyano, pyridyl, piperidyl, piperazinyl, and morpholino groups.

Examples of the oxygen atom-bearing functional group include alkoxy groups such as methoxy, ethoxy, n-propoxy, isopropoxy, n-butoxy, sec-butoxy, and t-butoxy groups; alkoxyalkyl groups such as methoxymethyl, methoxyethyl, ethoxymethyl, and ethoxyethyl groups; alkoxyaryl groups such as methoxyphenyl and ethoxyphenyl groups; and alkylene oxide groups such as epoxy and tetrahydrofuranyl groups. Other examples include trialkylsilyloxy groups Such as trimethylsilyloxy, triethylsilyloxy, and t-butyldimethylsilyloxy groups. Additional examples include a hydroxyl group.

$A^3$ is preferably a hydroxyl group or a group represented by formula (IIIa) below, and more preferably a group represented by the following formula (IIIa):

(IIIa)

wherein $R^{23}$ and $R^{24}$ each independently represent a $C_{1-6}$ group optionally containing at least one atom selected from the group consisting of a nitrogen atom, an oxygen atom, and a silicon atom, $R^{23}$ and $R^{24}$ may be bonded to each other to form a cyclic structure together with the nitrogen atom, and $R^{23}$ and $R^{24}$ may form a single group bonded to the nitrogen via a double bond.

Examples of $R^{23}$ and $R^{24}$ in formula (IIIa) include $C_{1-6}$ hydrocarbyl groups, $C_{1-6}$ substituted hydrocarbyl groups, and substituted silyl groups.

The hydrocarbyl groups encompassed by $R^{23}$ and $R^{24}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{23}$ and $R^{24}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-bearing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by substituting at least one hydrogen atom of an alkyl group by an alkylene oxide group.

The substituted silyl groups encompassed by $R^{23}$ and $R^{24}$ can be exemplified by trialkylsilyl groups such as trimethylsilyl, triethylsilyl, and t-butyldimethylsilyl groups; and trialkoxysilyl groups such as a trimethoxysilyl group.

The groups in which $R^{23}$ and $R^{24}$ are bonded to each other can be exemplified by $C_{2-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —CH$_2$CH$_2$—NH—CH$_2$— and a group represented by —CH$_2$CH$_2$—N=CH—.

The group in which $R^{23}$ and $R^{24}$ are bonded to each other is preferably a nitrogenous group, and more preferably a group represented by —CH$_2$CH$_2$—NH—CH$_2$— or a group represented by —CH$_2$CH$_2$—N=CH—.

Examples of the single group bonded to the nitrogen via a double bond, formed by $R^{23}$ and $R^{24}$, include $C_{2-12}$ divalent groups optionally containing at least one atom selected from the group consisting of a nitrogen atom, an oxygen atom, and a silicon atom. Specific examples thereof include an ethylidene group, a 1-methylpropylidene group, a 1,3-dimethylbutylidene group, a 1-methylethylidene group, and a 4-N,N-dimethylaminobenzylidene group.

The hydrocarbyl group encompassed by $R^{23}$ and $R^{24}$ is preferably an alkyl group, more preferably a $C_{1-4}$ alkyl group, still more preferably a methyl group, an ethyl group, an n-propyl group, or an n-butyl group, and particularly preferably a methyl group or an ethyl group. The substituted hydrocarbyl group encompassed by $R^{23}$ and $R^{24}$ is preferably an alkoxyalkyl group, an alkylene oxide group, or an alkylene oxide alkyl group. The substituted silyl group encompassed by $R^{23}$ and $R^{24}$ is preferably a trialkylsilyl group or a trialkoxysilyl group, more preferably a trialkylsilyl group, and still more preferably a trimethylsilyl group or a triethylsilyl group.

Preferably, $R^{23}$ and $R^{24}$ are a nitrogenous group in which $R^{23}$ and $R^{24}$ are bonded to each other, or are each independently an alkyl group, an alkoxyalkyl group, an alkylene oxide group, an alkylene oxide alkyl group, or a substituted silyl group, more preferably an alkyl group, an alkylene oxide group, an alkylene oxide alkyl group, or a trialkylsilyl group.

The groups represented by formula (IIIa) can be exemplified by acyclic amino groups and cyclic amino groups.

Examples of the acyclic amino groups include dialkylamino groups such as dimethylamino, diethylamino, di(n-propyl)amino, di(isopropyl)amino, di(n-butyl)amino, di(sec-butyl)amino, di(tert-butyl)amino, di(neopentyl) amino, and ethylmethylamino groups; di(alkoxyalkyl)amino groups such as di(methoxymethyl)amino, di(methoxyethyl) amino, di(ethoxymethyl)amino, and di(ethoxyethyl)amino groups; and di(trialkylsilyl)amino groups such as di(trimethylsilyl)amino and di(t-butyldimethylsilyl)amino groups. Other examples include di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Additional examples include ethylideneamino, 1-methylpropylideneamino, 1,3-dimethylbutylideneamino, 1-methylethylideneamino, and 4-N,N-dimethylaminobenzylideneamino groups.

As used herein, the term "di(alkylene oxide)amino group" denotes an amino group in which two hydrogen atoms bonded to the nitrogen atom are substituted by two alkylene oxide groups. The term "di(alkylene oxide alkyl)amino group" denotes an amino group in which two hydrogen atoms bonded to the nitrogen atom are substituted by two alkylene oxide alkyl groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, abrasion resistance, and long-term stability and easy availability of the compound, the group represented by formula (IIIac) is preferably an acyclic amino group, and is more preferably a dialkylamino group, a di(alkylene oxide)amino group, a di(alkylene oxide alkyl)amino group, or a di(trialkylsilyl) amino group.

The compounds represented by formula (III) can be exemplified by compounds in which $A^2$ is a secondary amino group, such as acrylamide compounds and methacrylamide compounds.

The acrylamide compounds in which $A^3$ is a nitrogen atom-bearing group can be exemplified by
N-(2-dimethylaminoethyl)acrylamide,
N-(2-diethylaminoethyl)acrylamide,
N-(3-dimethylaminopropyl)acrylamide,
N-(3-diethylaminopropyl)acrylamide,
N-(4-dimethylaminobutyl)acrylamide,
N-(4-diethylaminobutyl)acrylamide,
N-(3-morpholinopropyl)acrylamide, and
N-(3-cyanopropyl)acrylamide.

The methacrylamide compounds in which $A^3$ is a nitrogen atom-bearing group can be exemplified by N-(2-dimethylaminoethyl)methacrylamide,
N-(2-diethylaminoethyl)methacrylamide,
N-(3-dimethylaminopropyl)methacrylamide,
N-(3-diethylaminopropyl)methacrylamide,
N-(4-dimethylaminobutyl)methacrylamide,
N-(4-diethylaminobutyl)methacrylamide,
N-(3-morpholinopropyl)methacrylamide, and
N-(3-cyanopropyl)methacrylamide.

The acrylamide compounds in which $A^3$ is an oxygen atom-bearing group can be exemplified by
N-(3-methoxypropyl)acrylamide,
N-(3-ethoxypropyl)acrylamide,
N-(propoxymethyl)acrylamide,
N-(butoxymethyl)acrylamide,
N-glycidylacrylamide, and
N-tetrahydrofurfurylacrylamide.

The methacrylamide compounds in which $A^3$ is an oxygen atom-bearing group can be exemplified by
N-(3-methoxypropyl)methacrylamide,
N-(3-ethoxypropyl)methacrylamide,
N-(propoxymethyl)methacrylamide,
N-(butoxymethyl)methacrylamide,
N-glycidylmethacrylamide, and
N-tetrahydrofurfurylmethacrylamide.

The acrylamide compounds in which $A^3$ is a group bearing both nitrogen and oxygen atoms can be exemplified by
N-(3-di(glycidyl)aminopropyl)acrylamide, and
N-(3-di(tetrahydrofurfuryl)aminopropyl)acrylamide.

The methacrylamide compounds in which $A^3$ is a group bearing both nitrogen and oxygen atoms can be exemplified by N-(3-di(glycidyl)aminopropyl)methacrylamide, and
N-(3-di(tetrahydrofurfuryl)aminopropyl)methacrylamide.

The compounds represented by formula (III) can also be exemplified by compounds in which $A^2$ is an oxygen atom, such as acrylate compounds and methacrylate compounds.

The acrylate compounds in which $A^3$ is a nitrogen atom-bearing group can be exemplified by
2-dimethylaminoethyl acrylate,
2-diethylaminoethyl acrylate,
3-dimethylaminopropyl acrylate,
3-diethylaminopropyl acrylate,
4-dimethylaminobutyl acrylate, and
4-diethylaminobutyl acrylate.

The methacrylate compounds in which $A^3$ is a nitrogen atom-bearing group can be exemplified by
2-dimethylaminoethyl methacrylate,
2-diethylaminoethyl methacrylate,
3-dimethylaminopropyl methacrylate,
3-diethylaminopropyl methacrylate,
4-dimethylaminobutyl methacrylate, and
4-diethylaminobutyl methacrylate.

The acrylate compounds in which $A^3$ is an oxygen atom-bearing group can be exemplified by
2-ethoxyethyl acrylate,
2-propoxyethyl acrylate,
2-butoxyethyl acrylate,
3-methoxypropyl acrylate,
3-ethoxypropyl acrylate,
glycidyl acrylate, and
tetrahydrofurfuryl acrylate.

The methacrylate compounds in which $A^3$ is an oxygen atom-bearing group can be exemplified by
2-ethoxyethyl methacrylate,
2-propoxyethyl methacrylate,
2-butoxyethyl methacrylate,
3-methoxypropyl methacrylate,
3-ethoxypropyl methacrylate,
glycidyl methacrylate, and
tetrahydrofurfuryl methacrylate.

The acrylate compounds in which $A^3$ is a group bearing both nitrogen and oxygen atoms can be exemplified by
3-di(glycidyl)aminopropyl acrylate, and
3-di(tetrahydrofurfuryl)aminopropyl acrylate.

The methacrylate compounds in which $A^3$ is a group bearing both nitrogen and oxygen atoms can be exemplified by 3-di(glycidyl)aminopropyl methacrylate, and 3-di(tetrahydrofurfuryl)aminopropyl methacrylate.

In view of enhancing the fuel economy, wet-grip performance, abrasion resistance, and kneading processability in a balanced manner, the compound represented by formula (III) is preferably a compound in which $A^3$ is a group represented by formula (IIIa), more preferably a compound in which $A^2$ is an amino group and $A^3$ is a group represented by formula (IIIa), and still more preferably a compound in which $A^2$ is a secondary amino group (—NH—) and $A^3$ is a group represented by formula (IIIa).

The compound in which $A^2$ is a secondary amino group and $A^3$ is a group represented by formula (IIIa) is preferably an N-(3-dialkylaminopropyl)acrylamide or an N-(3-dialkylaminopropyl)methacrylamide, and more preferably
N-(3-dimethylaminopropyl)acrylamide,
N-(3-diethylaminopropyl)acrylamide,
N-(3-dimethylaminopropyl)methacrylamide, or
N-(3-diethylaminopropyl)methacrylamide.

The following explains the compound (modifying agent 3) containing a group represented by formula (IV) below,

wherein p represents an integer of 1 to 11, and $A^4$ represents a functional group bearing a nitrogen atom.

Here, p represents an integer of 1 to 11, and is preferably not less than 1 in view of enhancing the fuel economy, whereas p is preferably not more than 4 in view of enhancing the economic efficiency of the production. $A^4$ represents a nitrogen atom-bearing functional group and examples thereof include amino, isocyano, cyano, pyridyl, piperidyl, pyrazinyl, and morpholino groups.

The compounds containing a group represented by formula (IV) can be exemplified by compounds represented by the following formula (IVa):

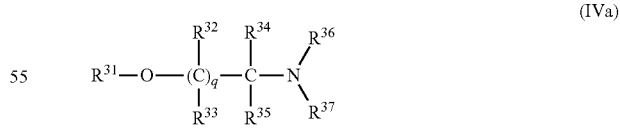

wherein q represents an integer of 0 to 10; $R^{31}$ represents a $C_{1-5}$ hydrocarbyl group; $R^{32}$, $R^{33}$, $R^{34}$ and $R^{35}$ each independently represent a hydrogen atom, a hydrocarbyl group, a $C_{1-5}$ substituted hydrocarbyl group, or a $C_{1-5}$ hydrocarbyloxy group, and when a plurality of $R^{32}$'s and a plurality of $R^{33}$'s are present, the plurality of $R^{32}$'s and the plurality of $R^{33}$'s may be the same as or different from one another; and $R^{36}$ and $R^{37}$ each independently represent a $C_{1-6}$ group optionally containing at least one atom selected from the group consisting of a nitrogen atom, an oxygen atom, and a silicon atom, $R^{36}$ and $R^{37}$ may be bonded to each other to form a cyclic structure together with the nitrogen atom, and $R^{36}$ and $R^{37}$ may form a single group bonded to the nitrogen via a double bond.

In formula (IVa), q represents an integer of 0 to 10. In view of enhancing the economic efficiency, q is preferably not more than 3, and more preferably 0.

$R^{31}$ in formula (IVa) represents a $C_{1-5}$ hydrocarbyl group. The hydrocarbyl groups encompassed by $R^{31}$ can be exemplified by alkyl groups such as methyl, ethyl, n-propyl, isopropyl, n-butyl, sec-butyl, and t-butyl groups.

The hydrocarbyl group encompassed by $R^{31}$ is preferably an alkyl group, more preferably a $C_{1-4}$ alkyl group, and still more preferably a methyl group or an ethyl group.

$R^{32}$ to $R^{35}$ in formula (IVa) each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^{32}$'s and a plurality of $R^{33}$'s are present, the plurality of $R^{32}$'s and the plurality of $R^{33}$'s may be the same as or different from one another.

The hydrocarbyl groups encompassed by $R^{32}$ to $R^{35}$ can be exemplified by alkyl groups such as methyl, ethyl, n-propyl, isopropyl, n-butyl, sec-butyl, and t-butyl groups.

The substituted hydrocarbyl groups encompassed by $R^{32}$ to $R^{35}$ can be exemplified by substituted hydrocarbyl groups containing as a substituent at least one group selected from the group consisting of nitrogen atom-bearing groups and oxygen atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups.

The hydrocarbyloxy groups encompassed by $R^{32}$ to $R^{35}$ can be exemplified by alkoxy groups such as methoxy, ethoxy, n-propoxy, isopropoxy, n-butoxy, sec-butoxy, and t-butoxy groups.

The hydrocarbyl group encompassed by $R^{32}$ to $R^{35}$ is preferably an alkyl group, more preferably a $C_{1-4}$ alkyl group, and still more preferably a methyl group or an ethyl group.

The substituted hydrocarbyl group encompassed by $R^{32}$ to $R^{35}$ is preferably an alkoxyalkyl group, more preferably a $C_{1-4}$ alkoxyalkyl group, and still more preferably a methoxymethyl group or an ethoxyethyl group.

The hydrocarbyloxy group encompassed by $R^{32}$ to $R^{35}$ is preferably an alkoxy group, more preferably a $C_{1-3}$ alkoxy group, and still more preferably a methoxy group or an ethoxy group.

In view of economic efficiency and in view of enhancing the fuel economy, wet-grip performance, abrasion resistance, and kneading processability in a balanced manner, preferably one of $R^{34}$ and $R^{35}$ is a hydrogen atom. More preferably, one of $R^{34}$ and $R^{35}$ is a hydrogen atom and the other is an alkyl group or an alkoxy group. Still more preferably, one of $R^{34}$ and $R^{35}$ is a hydrogen atom and the other is an alkoxy group, particularly preferably a methoxy group or an ethoxy group.

$R^{36}$ and $R^{37}$ in formula (IVa) each independently represent a $C_{1-6}$ group optionally containing at least one atom selected from the group consisting of a nitrogen atom, an oxygen atom, and a silicon atom; $R^{36}$ and $R^{37}$ may be bonded to each other to form a cyclic structure together with the nitrogen atom; and $R^{36}$ and $R^{37}$ may form a single group bonded to the nitrogen via a double bond.

Examples of $R^{36}$ and $R^{37}$ in formula (IVa) include $C_{1-6}$ hydrocarbyl groups, $C_{1-6}$ substituted hydrocarbyl groups, and substituted silyl groups.

The hydrocarbyl groups encompassed by $R^{36}$ and $R^{37}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{36}$ and $R^{37}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-bearing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by substituting at least one hydrogen atom of an alkyl group by an alkylene oxide group.

The substituted silyl groups encompassed by $R^{36}$ and $R^{37}$ can be exemplified by trialkylsilyl groups such as trimethylsilyl, triethylsilyl, and t-butyldimethylsilyl groups; and trialkoxysilyl groups such as a trimethoxysilyl group.

The groups in which $R^{36}$ and $R^{37}$ are bonded to each other can be exemplified by $C_{2-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —CH$_2$CH$_2$—NH—CH$_2$— and a group represented by —CH$_2$CH$_2$—N═CH—.

The group in which $R^{36}$ and $R^{37}$ are bonded to each other is preferably a nitrogenous group, and more preferably a group represented by —CH$_2$CH$_2$—NH—CH$_2$— or a group represented by —CH$_2$CH$_2$—N═CH—.

Examples of the single group bonded to the nitrogen via a double bond, formed by $R^{36}$ and $R^{37}$, include $C_{2-12}$ divalent groups optionally containing at least one atom selected from the group consisting of a nitrogen atom, an oxygen atom, and a silicon atom. Specific examples include an ethylidene group, a 1-methylpropylidene group, a 1,3-dimethylbutylidene group, a 1-methylethylidene group, and a 4-N,N-dimethylaminobenzylidene group.

The hydrocarbyl group encompassed by $R^{36}$ and $R^{37}$ is preferably an alkyl group, more preferably a $C_{1-4}$ alkyl group, still more preferably a methyl group, an ethyl group, an n-propyl group, or an n-butyl group, and particularly preferably a methyl group or an ethyl group. The substituted hydrocarbyl group encompassed by $R^{36}$ and $R^{37}$ is preferably an alkoxyalkyl group, an alkylene oxide group, or an alkylene oxide alkyl group. The substituted silyl group encompassed by $R^{36}$ and $R^{37}$ is preferably a trialkylsilyl group or a trialkoxysilyl group, more preferably a trialkylsilyl group, and still more preferably a trimethylsilyl group or a triethylsilyl group.

Preferably, $R^{36}$ and $R^{37}$ are a nitrogenous group in which $R^{36}$ and $R^{37}$ are bonded to each other, or are each independently an alkyl group, an alkoxyalkyl group, or a substituted silyl group. $R^{36}$ and $R^{37}$ are each independently more preferably a $C_{1-4}$ alkyl group, still more preferably a methyl group, an ethyl group, an n-propyl group, or an n-butyl group, and particularly preferably a methyl group or an ethyl group.

Examples of the amino group in which $R^{36}$ and $R^{37}$ are bonded to the nitrogen atom include acyclic amino groups and cyclic amino groups.

Examples of the acyclic amino groups include dialkylamino groups such as dimethylamino, diethylamino, di(n-propyl)amino, di(isopropyl)amino, di(n-butyl)amino, di(sec-butyl)amino, di(tert-butyl)amino, di(neopentyl) amino, and ethylmethylamino groups; di(alkoxyalkyl)amino groups such as di(methoxymethyl)amino, di(methoxyethyl) amino, di(ethoxymethyl)amino, and di(ethoxyethyl)amino groups; and di(trialkylsilyl)amino groups such as di(trimethylsilyl)amino and di(t-butyldimethylsilyl)amino groups. Other examples include di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Additional examples include ethylideneamino, 1-methylpropylideneamino, 1,3-dimethylbutylideneamino, 1-methylethylideneamino, and 4-N,N-dimethylaminobenzylideneamino groups.

The cyclic amino groups can be exemplified by 1-polymethyleneimino groups such as 1-pyrrolidinyl, 1-piperidine, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, abrasion resistance, kneading processability, and long-term stability and easy availability of the compound, the amino group in which $R^{36}$ and $R^{37}$ are bonded to the nitrogen atom is preferably an acyclic amino group, more preferably a dialkylamino group, and still more preferably a dimethylamino group or a diethylamino group.

The compounds represented by formula (IVa) can be exemplified by N,N-dialkyl-substituted carboxylic acid amide dialkyl acetal compounds.

The N,N-dialkyl-substituted carboxylic acid amide dialkyl acetal compounds can be exemplified by
N,N-dialkylformamide dialkyl acetals such as
N,N-dimethylformamide dimethyl acetal,
N,N-diethylformamide dimethyl acetal,
N,N-di(n-propyl)formamide dimethyl acetal,
N,N-dimethylformamide diethyl acetal,
N,N-diethylformamide diethyl acetal,
N,N-di(n-propyl)formamide diethyl acetal,
N,N-dimethylformamide ethyl methyl acetal,
N,N-diethylformamide ethyl methyl acetal, and
N,N-di(n-propyl)formamide ethyl methyl acetal;
N,N-dialkylacetamide dialkyl acetals such as
N,N-dimethylacetamide dimethyl acetal,
N,N-diethylacetamide dimethyl acetal,
N,N-di(n-propyl)acetamide dimethyl acetal,
N,N-dimethylacetamide diethyl acetal,
N,N-diethylacetamide diethyl acetal,
N,N-di(n-propyl)acetamide diethyl acetal,
N,N-dimethylacetamide ethyl methyl acetal,
N,N-diethylacetamide ethyl methyl acetal, and
N,N-di(n-propyl)acetamide ethyl methyl acetal; and
N,N-dialkylpropionamide dialkyl acetals such as
N,N-dimethylpropionamide dimethyl acetal,
N,N-diethylpropionamide dimethyl acetal,
N,N-di(n-propyl)propionamide dimethyl acetal,
N,N-dimethylpropionamide diethyl acetal,
N,N-diethylpropionamide diethyl acetal,
N,N-di(n-propyl)propionamide diethyl acetal,
N,N-dimethylpropionamide ethyl methyl acetal,
N,N-diethylpropionamide ethyl methyl acetal, and
N,N-di(n-propyl)propionamide ethyl methyl acetal.

In view of enhancing the fuel economy, wet-grip performance, abrasion resistance, and kneading processability in a balanced manner, N,N-dialkylformamide dialkyl acetals are preferred among the preceding, and
N,N-dimethylformamide dimethyl acetal,
N,N-diethylformamide dimethyl acetal,
N,N-dimethylformamide diethyl acetal, and
N,N-diethylformamide diethyl acetal are more preferred.

In addition to the conjugated diene-based constituent unit (conjugated diene unit), the conjugated diene polymer may also contain a constituent unit based on another monomer. Such other monomers include aromatic vinyls, vinyl nitriles, unsaturated carboxylic acid esters, and the like. The aromatic vinyls can be exemplified by styrene, α-methylstyrene, vinyltoluene, vinylnaphthalene, divinylbenzene, trivinylbenzene, and divinylnaphthalene.

The vinyl nitriles can be exemplified by acrylonitrile. The unsaturated carboxylic acid esters can be exemplified by methyl acrylate, ethyl acrylate, methyl methacrylate, and ethyl methacrylate. Aromatic vinyls are preferred among the preceding, and styrene is more preferred.

The conjugated diene polymer preferably contains an aromatic vinyl-based constituent unit (aromatic vinyl unit) in consideration of abrasion resistance. In this case, the aromatic vinyl unit content, based on a total of 100% by mass of the conjugated diene unit and the aromatic vinyl unit, is preferably at least 10% by mass (the conjugated diene unit content is not more than 90% by mass), and more preferably at least 15% by mass (the conjugated diene unit content is not more than 85% by mass). In view of fuel economy, the aromatic vinyl unit content is preferably not more than 50% by mass (the conjugated diene unit content is at least 50% by mass), and more preferably not more than 45% by mass (the conjugated diene unit content is at least 55% by mass).

In view of fuel economy, the conjugated diene polymer preferably has a vinyl bond content of not more than 80 mol %, more preferably not more than 70 mol %, per 100 mol % of the conjugated diene unit. In view of wet-grip performance, the vinyl bond content is preferably at least 10 mol %, more preferably at least 15 mol %, still more preferably at least 20 mol %, and particularly preferably at least 40 mol %. The vinyl bond content can be determined by infrared spectroscopic analysis from the intensity of the absorption in the vicinity of 910 $cm^{-1}$, which is an absorption peak for a vinyl group.

The molecular weight distribution of the conjugated diene polymer, in view of fuel economy, is preferably 1 to 5, and more preferably 1 to 2. The molecular weight distribution can be determined by measuring the number-average molecular weight (Mn) and the weight-average molecular weight (Mw) by gel permeation chromatography (GPC) and dividing Mw by Mn.

The conjugated diene polymer may suitably be produced by a method including the following Step A and Step B.

(Step A): A step of polymerizing monomers including a conjugated diene and a vinyl compound represented by formula (V) below in the presence of an alkali metal catalyst in a hydrocarbon solvent to obtain a polymer that contains a constituent unit based on the conjugated diene and a constituent unit based on the vinyl compound represented by the formula (V) and has an alkali metal derived from the catalyst at at least one polymer chain terminal:

wherein $X^4$, $X^5$, and $X^6$ each independently represent a group represented by formula (Va) below, a hydrocarbyl group, or a substituted hydrocarbyl group, and at least one of $X^4$, $X^5$, and $X^6$ is a group represented by the following formula (Va):

wherein $R^{41}$ and $R^{42}$ each independently represent a $C_{1-6}$ hydrocarbyl group, a $C_{1-6}$ substituted hydrocarbyl group, a silyl group, or a substituted silyl group, and $R^{41}$ and $R^{42}$ may be bonded to each other to form a cyclic structure together with the nitrogen atom.

(Step B): A step of reacting the polymer obtained in Step A with at least one of the modifying agents 1 to 3.

The alkali metal catalysts that can be used in (Step A) can be exemplified by alkali metals, organoalkali metal compounds, alkali metal/polar compound complexes, and alkali metal-containing oligomers. Examples of the alkali metals include lithium, sodium, potassium, rubidium, and cesium. Examples of the organoalkali metal compounds include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of the alkali metal/polar compound complex include potassium-tetrahydrofuran complexes and potassium-diethoxyethane complexes. Examples of the alkali metal-containing oligomers include sodium salts of α-methylstyrene tetramer. Organolithium compounds and organosodium compounds are preferred among the preceding, and $C_{2-20}$ organolithium or organosodium compounds are more preferred.

The hydrocarbon solvent used in (Step A) is a solvent that does not deactivate the organoalkali metal compound catalyst, and examples thereof include aliphatic hydrocarbons, aromatic hydrocarbons, and alicyclic hydrocarbons. The aliphatic hydrocarbons can be exemplified by propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. The aromatic hydrocarbons can be exemplified by benzene, toluene, xylene, and ethylbenzene. The alicyclic hydrocarbons can be exemplified by cyclopentane and cyclohexane. These may be used alone or two or more may be used in combination. $C_{2-12}$ hydrocarbons are preferred among the preceding.

In (Step A), monomers including a conjugated diene and a vinyl compound represented by formula (V) are polymerized to produce a conjugated diene polymer having an alkali metal derived from the above-described alkali metal catalyst at a polymer chain terminal. The conjugated dienes can be exemplified by 1,3-butadiene, isoprene, 1,3-pentadiene, 2,3-dimethyl-1,3-butadiene, and 1,3-hexadiene. These may be used alone or two or more may be used in combination. In view of ease of availability, 1,3-butadiene and isoprene are preferred among the preceding.

$X^4$, $X^5$, and $X^6$ in formula (V) each independently represent a group represented by formula (Va), a hydrocarbyl group, or a substituted hydrocarbyl group, and at least one of $X^4$, $X^5$, and $X^6$ is a group represented by formula (Va).

$R^{41}$ and $R^{42}$ in formula (Va) each independently represent a $C_{1-6}$ hydrocarbyl group, a $C_{1-6}$ substituted hydrocarbyl group, a silyl group, or a substituted silyl group, and $R^{41}$ and $R^{42}$ may be bonded to each other to form a cyclic structure together with the nitrogen atom.

The $C_{1-6}$ hydrocarbyl groups encompassed by $R^{41}$ and $R^{42}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The $C_{1-6}$ substituted hydrocarbyl groups encompassed by $R^{41}$ and $R^{42}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups. The groups containing a silicon atom-bearing group as a substituent can be exemplified by trialkylsilylalkyl groups such as a trimethylsilylmethyl group.

The substituted silyl groups encompassed by $R^{41}$ and $R^{42}$ can be exemplified by trialkylsilyl groups such as trimethylsilyl, triethylsilyl, and t-butyldimethylsilyl groups.

The groups in which $R^{41}$ and $R^{42}$ are bonded to each other can be exemplified by $C_{1-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

The group in which $R^{41}$ and $R^{42}$ are bonded to each other is preferably a nitrogenous group, and more preferably a group represented by —$CH_2CH_2$—NH—$CH_2$— or a group represented by —$CH_2CH_2$—N=CH—.

The hydrocarbyl group encompassed by $R^{41}$ and $R^{42}$ is preferably an alkyl group, more preferably a $C_{1-4}$ alkyl group, still more preferably a methyl group, an ethyl group, an n-propyl group, or an n-butyl group, and particularly preferably an ethyl group or an n-butyl group. The substituted hydrocarbyl group encompassed by $R^{41}$ and $R^{42}$ is preferably an alkoxyalkyl group, and more preferably a alkoxyalkyl group. The substituted silyl group encompassed by $R^{41}$ and $R^{42}$ is preferably a trialkylsilyl group, and more preferably a trimethylsilyl group.

Preferably, $R^{41}$ and $R^{42}$ are each independently an alkyl group, an alkoxyalkyl group, or a substituted silyl group, or are a nitrogenous group in which $R^{41}$ and $R^{42}$ are bonded to each other. $R^{41}$ and $R^{42}$ are each independently more preferably an alkyl group, still more preferably a $C_{1-4}$ alkyl group, and particularly preferably a methyl group, an ethyl group, an n-propyl group, or an n-butyl group.

Examples of the group represented by formula (Va) include acyclic amino groups and cyclic amino groups.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino group can also be exemplified by 1-imidazolyl, 4,5-dihydro-1-imidazolyl, 1-imidazolidinyl, 1-piperazinyl, and morpholino groups.

In view of economic efficiency and ease of availability, the group represented by formula (Va) is preferably an acyclic amino group, more preferably a dialkylamino group, still more preferably a dialkylamino group which contains a $C_{1-4}$ alkyl group as a substituent, and particularly preferably a dimethylamino group, a diethylamino group, a di(n-propyl)amino group, or a di(n-butyl)amino group.

The hydrocarbyl groups encompassed by $X^4$, $X^5$, and $X^6$ in formula (V) can be exemplified by alkyl groups such as methyl, ethyl, n-propyl, isopropyl, n-butyl, sec-butyl, and tert-butyl groups. The substituted hydrocarbyl groups encompassed by the $X^4$, $X^5$, and $X^6$ can also be exemplified by alkoxyalkyl groups such as methoxymethyl, ethoxymethyl, methoxyethyl, and ethoxyethyl groups.

The hydrocarbyl group encompassed by $X^4$, $X^5$, and $X^6$ is preferably an alkyl group, more preferably a $C_{1-4}$ alkyl group, and still more preferably a methyl group or an ethyl group. The substituted hydrocarbyl group encompassed by $X^4$, $X^5$, and $X^6$ is preferably an alkoxyalkyl group, and more preferably a $C_{1-4}$ alkoxyalkyl group.

The hydrocarbyl group or substituted hydrocarbyl group encompassed by $X^4$, $X^5$, and $X^6$ is preferably an alkyl group or an alkoxyalkyl group, more preferably a $C_{1-4}$ alkyl group or a $C_{1-4}$ alkoxyalkyl group, still more preferably a $C_{1-4}$ alkyl group, and particularly preferably a methyl group or an ethyl group.

At least one of $X^4$, $X^5$, and $X^6$ in formula (V) is a group represented by formula (Va). Preferably at least two of $X^4$, $X^5$, and $X^6$ are groups represented by formula (Va). More preferably two of $X^4$, $X^5$, and $X^6$ are groups represented by formula (Va).

Examples of the vinyl compound represented by formula (V) used in (Step A) include compounds in which one of $X^4$, $X^5$, and $X^6$ is an acyclic amino group represented by formula (Va) and the other two are, independently, a hydrocarbyl group or a substituted hydrocarbyl group, e.g., (dialkylamino)dialkylvinylsilanes, {di(trialkylsilyl)amino}dialkylvinylsilanes, and (dialkylamino)dialkoxyalkylvinylsilanes.

The (dialkylamino)dialkylvinylsilanes can be exemplified by
(dimethylamino)dimethylvinylsilane,
(ethylmethylamino)dimethylvinylsilane,
(diethylamino)dimethylvinylsilane,
(ethyl-n-propylamino)dimethylvinylsilane,
(ethylisopropylamino)dimethylvinylsilane,
(di(n-propyl)amino)dimethylvinylsilane,
(diisopropylamino)dimethylvinylsilane,
(n-butyl-n-propylamino)dimethylvinylsilane,
(di(n-butyl)amino)dimethylvinylsilane,
(dimethylamino)diethylvinylsilane,
(ethylmethylamino)diethylvinylsilane,
(diethylamino)diethylvinylsilane,
(ethyl-n-propylamino) diethylvinylsilane,
(ethylisopropylamino)diethylvinylsilane,
(di(n-propyl)amino)diethylvinylsilane,
(diisopropylamino)diethylvinylsilane,
(n-butyl-n-propylamino) diethylvinylsilane,
(di(n-butyl)amino)diethylvinylsilane,
(dimethylamino)dipropylvinylsilane,
(ethylmethylamino)dipropylvinylsilane,
(diethylamino)dipropylvinylsilane,
(ethyl-n-propylamino)dipropylvinylsilane,
(ethylisopropylamino)dipropylvinylsilane,
(di(n-propyl)amino)dipropylvinylsilane,
(diisopropylamino)dipropylvinylsilane,
(n-butyl-n-propylamino)dipropylvinylsilane,
(di(n-butyl)amino)dipropylvinylsilane,
(dimethylamino)dibutylvinylsilane,
(ethylmethylamino)dibutylvinylsilane,
(diethylamino)dibutylvinylsilane,
(ethyl-n-propylamino)dibutylvinylsilane,
(ethylisopropylamino)dibutylvinylsilane,
(di(n-propyl)amino)dibutylvinylsilane,
(diisopropylamino)dibutylvinylsilane,
(n-butyl-n-propylamino)dibutylvinylsilane, and
(di(n-butyl)amino)dibutylvinylsilane.

The {di(trialkylsilyl)amino}dialkylvinylsilanes can be exemplified by
{di(trimethylsilyl)amino}dimethylvinylsilane,
{di(t-butyldimethylsilyl)amino}dimethylvinylsilane,
{di(trimethylsilyl)amino}diethylvinylsilane, and
{di(t-butyldimethylsilyl)amino}diethylvinylsilane.

The (dialkylamino)dialkoxyalkylvinylsilanes can be exemplified by
(dimethylamino)dimethoxymethylvinylsilane,
(dimethylamino)dimethoxyethylvinylsilane,
(dimethylamino) diethoxymethylvinylsilane,
(dimethylamino)diethoxyethylvinylsilane,
(diethylamino)dimethoxymethylvinylsilane,
(diethylamino)dimethoxyethylvinylsilane,
(diethylamino) diethoxymethylvinylsilane, and
(diethylamino)diethoxyethylvinylsilane.

Examples of compounds in which two of $X^4$, $X^5$, and $X^6$ are acyclic amino groups represented by formula (Va) and the other one is a hydrocarbyl group or a substituted hydrocarbyl group include bis(dialkylamino)-alkylvinylsilanes, bis{di(trialkylsilyl)amino}-alkylvinylsilanes, and bis(dialkylamino)-alkoxyalkylvinylsilanes.

The bis(dialkylamino)alkylvinylsilanes can be exemplified by bis(dimethylamino)methylvinylsilane,
bis(ethylmethylamino)methylvinylsilane,
bis(diethylamino)methylvinylsilane,
bis(ethyl-n-propylamino)methylvinylsilane,
bis(ethylisopropylamino)methylvinylsilane,
bis(di(n-propyl)amino)methylvinylsilane,
bis(diisopropylamino)methylvinylsilane,
bis(n-butyl-n-propylamino)methylvinylsilane,
bis(di(n-butyl)amino)methylvinylsilane,
bis(dimethylamino)ethylvinylsilane,
bis(ethylmethylamino)ethylvinylsilane,
bis(diethylamino)ethylvinylsilane,
bis(ethyl-n-propylamino)ethylvinylsilane,
bis(ethylisopropylamino)ethylvinylsilane,
bis(di(n-propyl)amino)ethylvinylsilane,
bis(diisopropylamino)ethylvinylsilane,
bis(n-butyl-n-propylamino)ethylvinylsilane,
bis(di(n-butyl)amino)ethylvinylsilane,
bis(dimethylamino)propylvinylsilane,
bis(ethylmethylamino)propylvinylsilane,
bis(diethylamino)propylvinylsilane,
bis(ethyl-n-propylamino)propylvinylsilane,
bis(ethylisopropylamino)propylvinylsilane,
bis(di(n-propyl)amino)propylvinylsilane,
bis(diisopropylamino)propylvinylsilane,
bis(n-butyl-n-propylamino)propylvinylsilane,
bis(di(n-butyl)amino)propylvinylsilane,
bis(dimethylamino)butylvinylsilane,
bis(ethylmethylamino)butylvinylsilane,
bis(diethylamino)butylvinylsilane,
bis(ethyl-n-propylamino)butylvinylsilane,
bis(ethylisopropylamino)butylvinylsilane,
bis(di(n-propyl)amino)butylvinylsilane,
bis(diisopropylamino)butylvinylsilane,
bis(n-butyl-n-propylamino)butylvinylsilane, and
bis(di(n-butyl)amino)butylvinylsilane.

The bis{di(trialkylsilyl)amino}alkylvinylsilanes can be exemplified by
bis{di(trimethylsilyl)amino}methylvinylsilane,
bis{di(t-butyldimethylsilyl)amino}methylvinylsilane,
bis{di(trimethylsilyl)amino}ethylvinylsilane, and
bis{di(t-butyldimethylsilyl)amino}ethylvinylsilane.

The bis(dialkylamino)alkoxyalkylvinylsilanes can be exemplified by
bis(dimethylamino)methoxymethylvinylsilane,
bis(dimethylamino)methoxyethylvinylsilane,
bis(dimethylamino)ethoxymethylvinylsilane,
bis(dimethylamino)ethoxyethylvinylsilane,
bis(diethylamino)methoxymethylvinylsilane,
bis(diethylamino)methoxyethylvinylsilane,
bis(diethylamino)ethoxymethylvinylsilane, and
bis(diethylamino)ethoxyethylvinylsilane.

Examples of compounds in which the three of $X^4$, $X^5$, and $X^6$ are acyclic amino groups represented by formula (Va) include tri(dialkylamino)vinylsilanes. Specific examples thereof include:
tri(dimethylamino)vinylsilane,
tri(ethylmethylamino)vinylsilane,
tri(diethylamino)vinylsilane,
tri(ethylpropylamino)vinylsilane,
tri(dipropylamino)vinylsilane, and
tri(butylpropylamino)vinylsilane.

Examples of compounds in which two of $X^4$, $X^5$, and $X^6$ are cyclic amino groups represented by formula (Va) and the other one is a hydrocarbyl group or a substituted hydrocarbyl group include:

bis(morpholino)methylvinylsilane,
bis(piperidino)methylvinylsilane,
bis(4,5-dihydroimidazolyl)methylvinylsilane, and
bis(hexamethyleneimino)methylvinylsilane.

The vinyl compound represented by formula (V) in which two of $X^4$, $X^5$, and $X^6$ are groups represented by formula (Va) is preferably a vinyl compound in which two of $X^4$, $X^5$, and $X^6$ are acyclic amino groups. In view of fuel economy, wet-grip performance, abrasion resistance, and kneading processability, the vinyl compound is more preferably a bis(dialkylamino)alkylvinylsilane, and still more preferably bis(dimethylamino)methylvinylsilane, bis(diethylamino)methylvinylsilane, bis(di(n-propyl)amino)methylvinylsilane, or bis(di(n-butyl)amino)methylvinylsilane. Among the preceding, bis(diethylamino)methylvinylsilane and bis(di(n-butyl)amino)methylvinylsilane are preferred in terms of easy availability of the compound.

In (Step A), polymerization may be carried out by using the conjugated diene and the vinyl compound represented by formula (V) in combination with another monomer. Such other monomers include aromatic vinyls, vinyl nitriles, unsaturated carboxylic acid esters, and the like. The aromatic vinyls can be exemplified by styrene, α-methylstyrene, vinyltoluene, vinylnaphthalene, divinylbenzene, trivinylbenzene, and divinylnaphthalene. The vinyl nitriles can be exemplified by acrylonitrile. The unsaturated carboxylic acid esters can be exemplified by methyl acrylate, ethyl acrylate, methyl methacrylate, and ethyl methacrylate. Aromatic vinyls are preferred among the preceding, and styrene is more preferred.

In (Step A), polymerization may be carried out in the presence of an agent that adjusts the vinyl bond content of the conjugated diene unit, an agent that adjusts the distribution of the conjugated diene unit and constituent unit(s) based on monomer(s) other than the conjugated diene in the conjugated diene polymer chain, or the like (these agents are collectively referred to below as "regulators"). These agents can be exemplified by ether compounds, tertiary amines, and phosphine compounds. The ether compounds can be exemplified by cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. The tertiary amines can be exemplified by triethylamine, tripropylamine, tributylamine, N,N,N',N'-tetramethylethylenediamine, N,N-diethylaniline, pyridine, and quinoline. The phosphine compounds can be exemplified by trimethylphosphine, triethylphosphine, and triphenylphosphine. These may be used alone or two or more may be used in combination.

The polymerization temperature in (Step A) is typically 25 to 100° C., preferably 35 to 90° C., and more preferably 50 to 80° C. The polymerization time is typically 10 minutes to 5 hours.

In (Step B), the amount of the modifying agent(s) 1 to 3 to be contacted with the polymer prepared in Step A is typically 0.1 to 3 moles, preferably 0.5 to 2 moles, more preferably 0.7 to 1.5 moles, and further preferably 1 to 1.5 moles, per mole of an alkali metal derived from the organoalkali metal catalyst.

In (Step B), the temperature for the contact between the polymer prepared in Step A and at least one of the modifying agents 1 to 3 is typically 25 to 100° C., preferably 35 to 90° C., and more preferably 50 to 80° C. The contact time is typically 60 seconds to 5 hours, preferably 5 minutes to 1 hour, and more preferably 15 minutes to 1 hour.

In the method for producing the conjugated diene polymer, a coupling agent may be added to the hydrocarbon solution of the conjugated diene polymer as necessary, from the initiation of polymerization of monomers in the presence of the alkali metal catalyst to the termination of polymerization. The coupling agent may be a compound represented by the following formula (VI):

$$R^{10}{}_aML_{4-a} \tag{VI}$$

wherein $R^{10}$ represents an alkyl group, an alkenyl group, a cycloalkenyl group, or an aromatic residue; M represents a silicon atom or a tin atom; L represents a halogen atom or a hydrocarbyloxy group; and a represents an integer of 0 to 2.

The term "aromatic residue" denotes a monovalent group obtained by removing hydrogen bonded to the aromatic ring of an aromatic hydrocarbon.

The coupling agents represented by formula (VI) can be exemplified by silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of the coupling agent, in view of the kneading processability of the conjugated diene polymer, is preferably not less than 0.03 moles, and more preferably not less than 0.05 moles, per mole of an alkali metal derived from the alkali metal catalyst. In view of fuel economy, the amount is preferably not more than 0.4 moles, and more preferably not more than 0.3 moles.

The conjugated diene polymer can be recovered from the hydrocarbon solution of the conjugated diene polymer by a known recovery method, for example, by (1) addition of a coagulant to the hydrocarbon solution of the conjugated diene polymer or (2) addition of steam to the hydrocarbon solution of the conjugated diene polymer. The recovered conjugated diene polymer may be dried using a known drier, for example, a band drier or an extrusion drier.

In the method for producing the conjugated diene polymer, a treatment in which the group represented by formula (Ia) in the polymer is replaced by a hydroxyl group is preferably carried out by, for example, hydrolysis. This treatment may be carried out on the polymer alone or on a below-mentioned composition including the polymer. Examples of the hydrolysis method include known hydrolysis methods, e.g., methods using steam stripping. The treatment can convert at least one of $X^1$, $X^2$, and $X^3$ in formula (I) into hydroxyl group(s) and can thereby enhance the fuel economy, wet-grip performance, abrasion resistance, and kneading processability in a more balanced manner.

The conjugated diene polymer can be used as the rubber component of the rubber composition of the present invention, and is preferably used in combination with other rubber materials, additives and the like.

The conjugated diene polymer content, based on 100% by mass of the rubber component, is not less than 30% by mass, preferably not less than 40% by mass, and more preferably not less than 50% by mass. A conjugated diene polymer content of less than 30% by mass fails to achieve sufficient wet-grip performance. The conjugated diene polymer content is preferably not more than 90% by mass, and more preferably not more than 80% by mass. A conjugated diene polymer content in excess of 90% by mass fails to achieve sufficient fuel economy and abrasion resistance.

In the present invention, the high-cis polybutadiene (high-cis polybutadiene rubber) is used as a rubber component, in addition to the conjugated diene polymer.

The Mooney viscosity (ML ($ML_{1+4}$)) of the high-cis polybutadiene is 40 to 49, and preferably 40 to 47. A Mooney viscosity over that range reduces the kneading processability. A Mooney viscosity below the range reduces the abrasion resistance. As used herein, the Mooney viscosity (ML) of high-cis polybutadiene is a value measured at 100° C. in accordance with JIS K6300-1:2001.

The molecular weight distribution (weight-average molecular weight (Mw)/number-average molecular weight (Mn)) of the high-cis polybutadiene is 3.0 to 3.9, preferably 3.0 to 3.6. A molecular weight distribution over that range reduces the abrasion resistance. A molecular weight distribution below the range reduces the kneading processability. As use herein, the weight-average molecular weight (Mw) and number-average molecular weight (Mn) of high-cis butadiene are values measured by the methods described in Examples below.

The weight-average molecular weight (Mw) of the high-cis polybutadiene is preferably 500,000 to 700,000, and more preferably 550,000 to 650,000. A molecular weight over that range may reduce the kneading processability, and a molecular weight below the range may reduce the abrasion resistance.

The number-average molecular weight (Mn) of the high-cis polybutadiene is preferably 120,000 to 250,000, and more preferably 150,000 to 220,000. A molecular weight over that range may reduce the kneading processability, and a molecular weight below the range may reduce the abrasion resistance.

The high-cis polybutadiene has an index (n-value in Expression (1)) of velocity dependence of Mooney viscosity of 2.3 to 3.0, preferably 2.4 to 2.9, and more preferably 2.4 to 2.8. An n-value of less than 2.3 deteriorates the kneadability (dispersibility) of silica, resulting in poor kneading processability. An n-value of more than 3.0 deteriorates the fuel economy.

The n-value refers to a reciprocal of the slope of a straight line determined from a Mooney viscosity (ML) and the number (RS) of revolutions (per minute) of a rotor based on Expression (1) below when the Mooney viscosity (ML) is measured while varying the velocity of revolution of the rotor in accordance with JIS K6300-1:2001. Here, log(K) is an arbitrary number that indicates an intercept of the straight line, $$\log(ML)=\log(K)+n^{-1}\times\log(RS) \tag{Expression 1}$$

wherein RS indicates the number of revolutions per minute of a rotor, K indicates an arbitrary number, and ML indicates a Mooney viscosity.

It should be noted that Expression (1) can be provided based on a theoretical expression (Expression (2) below) of n power law index for non-Newtonian flow.

$$\gamma = k\tau^n \tag{Expression 2}$$

($\gamma$: velocity gradient, $\tau$: shear stress, $K^{-1}=\eta$: viscosity coefficient)

The n-value is determined based on the degree of branching and molecular weight distribution of polybutadiene, and does not correlate with the Mooney viscosity. Lager degree of branching or larger molecular weight distribution of polybutadiene results in a larger n-value. Smaller degree of branching or smaller molecular weight distribution of polybutadiene results in a smaller n-value.

The range of n-value may be controlled, for example, in the following two stages as the molecular weight distribution then needs to be optimized as well. First, polybutadienes of several kinds having small n-values and different molecular weights from one another are polymerized in a butadiene polymerization stage. Next, the polybutadienes of several kinds having different molecular weight from one another are blended to broaden the molecular weight distribution so that the n-value is controlled within an optimal range. The n-value in the polymerization stage can be controlled by adjusting the molar ratio of an organoaluminum compound, which is a promoter, and water. In other words, the larger the amount of water added to a predetermined amount of an organoaluminum compound is, the smaller the molar ratio is, and, in turn, the smaller the n-value tends to be. The molar ratio of an organoaluminum compound as a promoter and water in the polymerization stage is preferably not more than 2.0, and particularly preferably 1.0 to 1.5. A molar ratio exceeding 2.0 may result in an excessively large n-value, and a molar ratio of less than 1.0 may lead to a significantly reduced polymerization activity. Thus, these molar ratio ranges are not preferred.

The high-cis polybutadiene preferably has a ratio (Tcp/ML) of a 5% by mass toluene solution viscosity (Tcp) to the Mooney viscosity (ML) of 2.5 to 3.5, more preferably 2.5 to 3.0. A Tcp/ML ratio over that range may result in high cold flow properties of raw rubber (high-cis polybutadiene), and a Tcp/ML ratio below the range may lead to reduced abrasion resistance. Here, the 5% by mass toluene solution viscosity (Tcp) is determined as follows: 2.28 g of a high-cis polybutadiene is dissolved in 50 mL of toluene to give a solution, and the viscosity of the solution is measured at 25° C. with a Cannon-Fenske viscometer No. 400 using viscometer calibration standard solutions as standards (JIS Z8809).

The high-cis polybutadiene has a cis content of 95% by mass or more, preferably 97% by mass or more, and still more preferably 98% by mass or more. A cis content below that range leads to reduced abrasion resistance. The cis content is calculated by infrared absorption spectrum analysis.

The high-cis polybutadiene can be produced, for example, in the presence of a cobalt-based catalyst. The cobalt-based catalyst may be a catalytic system including (a) a cobalt compound, (b) an organoaluminum compound (preferably a halogen-containing organoaluminum compound), and (c) water.

Examples of the cobalt compound include salts and complexes of cobalt. Particularly preferred examples thereof include cobalt salts such as cobalt chloride, cobalt bromide, cobalt nitrate, cobalt octylate (ethylhexanoate), cobalt naphthenate, cobalt acetate, and cobalt malonate; cobalt bisacetylacetonate and cobalt trisacetylacetonate, cobalt acetoacetic acid ethyl ester complex, organic basic complexes of cobalt salts such as pyridine complexes or picoline complexes of cobalt salts; and ethyl alcohol complexes.

Examples of the organoaluminum compound include trialkyl aluminums, dialkyl aluminum chlorides, dialkyl aluminum bromides, alkyl aluminum sesquichlorides, alkyl aluminum sesquibromides, and alkyl aluminum dichlorides.

Specific exemplary compounds include trialkyl aluminums such as trimethyl aluminum, triethyl aluminum, triisobutyl aluminum, trihexyl aluminum, trioctyl aluminum, and tridecyl aluminum.

Additional examples of the compounds include organoaluminum halides such as dialkyl aluminum chlorides (e.g. dimethyl aluminum chloride, diethyl aluminum chloride), sesquiethyl aluminum chloride, and ethyl aluminum dichloride; and hydrogenated organoaluminum compounds such as diethyl aluminum hydride, diisobutyl aluminum hydride, and sesquiethyl aluminum hydride. Two or more of the organoaluminum compounds may be used in combination.

The molar ratio (b)/(a) between the component (a) and the component (b) is preferably 0.1 to 5000, and more preferably 1 to 2000.

The molar ratio (b)/(c) between the component (b) and the component (c) is preferably 0.7 to 5, more preferably 0.8 to 4, and particularly preferably 1 to 3.

Other than the butadiene monomer, the following monomers may be used in a small amount: a conjugated diene such as isoprene, 1,3-pentadiene, 2-ethyl-1,3-butadiene, 2,3-dimethylbutadiene, 2-methylpentadiene, 4-methylpentadiene, and 2,4-hexadiene; a acyclic monoolefin such as ethylene, propylene, butene-1, butene-2, isobutene, pentene-1, 4-methylpentene-1, hexene-1, and octene-1; a cyclic monoolefin such as cyclopentene, cyclohexene, and norbornene; and/or an aromatic vinyl compound such as styrene, and α-methylstyrene; and a non-conjugated diolefin such as dicyclopentadiene, 5-ethylidene-2-norbornene, and 1,5-hexadiene.

Polymerization methods are not particularly limited. For example, mass polymerization (bulk polymerization) using a conjugated diene compound monomer itself, such as 1,3-butadiene, as a polymerization solvent, and solution polymerization are applicable. Examples of the solvent in solution polymerization include aromatic hydrocarbons such as toluene, benzene, and xylene; aliphatic hydrocarbons such as n-hexane, butane, heptane, and pentane; alicyclic hydrocarbons such as cyclopentane, and cyclohexane; olefin-based hydrocarbons such as the above olefin compounds, cis-2-butene, and trans-2-butene; hydrocarbon-based solvents such as mineral spirit, solvent naphtha, and kerosene; and halogenated hydrocarbon-based solvents such as methylene chloride.

Toluene, cyclohexane, or a mixture of cis-2-butene with trans-2-butene may be especially preferably used.

Polymerization temperatures preferably fall within a range between −30° C. and 150° C., and particularly preferably within a range between 30° C. and 100° C. Polymerization periods of time preferably fall within a range between one minute and 12 hours, and particularly preferably within a range between five minutes and five hours.

After polymerization for a predetermined period of time, the inside of a polymerization vessel is depressurized if necessary, followed by post treatments such as washing and drying. In this way, the above high-cis polybutadiene can be obtained. Examples of commercially available products of the high-cis polybutadiene include BR710 produced by Ube Industries, Ltd.

The high-cis polybutadiene content based on 100% by mass of the rubber component is 10% by mass or more, and preferably 20% by mass or more. A high-cis polybutadiene content of less than 10% by mass fails to achieve sufficient kneading processability, fuel economy, and abrasion resistance. The high-cis polybutadiene content is 70% by mass or less, preferably 60% by mass or less, more preferably 55% by mass or less, and still more preferably 50% by mass or less. A high-cis polybutadiene content of more than 70% by mass leads to insufficient wet-grip performance, and kneading processability.

The combined content of the conjugated diene polymer and the high-cis polybutadiene, based on 100% by mass of the rubber component, is preferably 60% by mass or more, more preferably 80% by mass or more, and still more preferably 90% by mass or more, and may be 100% by mass. A combined content of lower than 60% by mass may fail to achieve fuel economy, wet-grip performance, abrasion resistance, and kneading processability in a balanced manner.

Examples of other rubber materials that can be used as the rubber component include conventional styrenebutadiene copolymer rubber, polybutadiene rubber (BR) other than the high-cis polybutadiene, butadiene-isoprene copolymer rubber, and butyl rubber. Moreover, natural rubber (NR), ethylene-propylene copolymers, ethylene-octene copolymers and the like may also be mentioned. Two or more kinds of these rubber materials may be used in combination.

The rubber composition of the present invention contains silica. The use of silica in addition to the conjugated diene polymer and the high-cis polybutadiene enables to favorably disperse silica, and enhance the fuel economy, wet-grip performance, abrasion resistance, and kneading processability in a balanced manner. Unlimited examples of the silica include dry silica (anhydrous silica) and wet silica (hydrous silica). Wet silica is preferred as it has a higher silanol group content. The silica may be used alone, or in a combination of two or more kinds thereof.

The silica preferably has a nitrogen adsorption specific surface area ($N_2SA$) of not less than 40 $m^2/g$, more preferably not less than 60 $m^2/g$, and still more preferably not less than 150 $m^2/g$. If the silica has a nitrogen adsorption specific surface area of less than 40 $m^2/g$, only a little reinforcing effect is likely to be obtained, and the abrasion resistance and breaking strength tend to be reduced. The silica preferably has a nitrogen adsorption specific surface area ($N_2SA$) of not more than 400 $m^2/g$, more preferably not more than 360 $m^2/g$, and still more preferably not more than 200 $m^2/g$. The silica having a $N_2SA$ of more than 400 $m^2/g$ is likely to have poor dispersibility, which results in reduction in the fuel economy and kneading processability.

The nitrogen adsorption specific surface area of silica is a value measured by the BET method in accordance with ASTM D3037-81.

The amount of silica per 100 parts by mass of the rubber component is not less than 5 parts by mass, preferably not less than 10 parts by mass, more preferably not less than 45 parts by mass, and still more preferably not less than 60% by mass. An amount of less than 5 parts by mass fails to sufficiently achieve an effect producible by mixing silica. Thus, the abrasion resistance tends to be reduced. The amount of silica is not more than 150 parts by mass, preferably not more than 120 parts by mass, more preferably not more than 100 parts by mass, and still more preferably not more than 90 parts by mass. An amount of more than 150 parts by mass tends to deteriorate the kneading processability.

The silica content, based on a total of 100% by mass of silica and carbon black, is preferably not less than 60% by mass, and more preferably not less than 85% by mass, but is also preferably not more than 98% by mass, and more preferably not more than 95% by mass. The fuel economy, wet-grip performance, abrasion resistance, and kneading processability can be enhanced at high levels in a balanced manner when the silica content is in the foregoing range.

A silane coupling agent may be used together with silica. The silane coupling agent may be any silane coupling agent conventionally used together with silica in the rubber industry. Examples of the silane coupling agent include sulfide silane coupling agents such as bis(3-triethoxysilylpropyl) tetrasulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane, and chloro silane coupling agents such as 3-chloropropyltrimethoxysilane. Sulfide silane coupling agents are preferred among the examples, and bis(3-triethoxysilylpropyl)tetrasulfide is more preferred.

The amount of the silane coupling agent per 100 parts by mass of silica is preferably not less than 1 part by mass, more preferably not less than 2 parts by mass, and still more preferably not less than 3 parts by mass. If the amount is less than 1 part by mass, an unvulcanized rubber composition to be obtained tends to have a high viscosity, thus reducing the kneading processability. The amount of the silane coupling agent is preferably not more than 20 parts by mass, and more preferably not more than 15 parts by mass. An amount of more than 20 parts by mass tends to fail to achieve an effect commensurate with the cost increase.

In the present invention, known additives may be used besides the aforementioned components. Examples of the additives include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organoperoxides; fillers such as carbon black, calcium carbonate, talc, alumina, clay, aluminum hydroxide, and mica; processing aids such as extender oils and lubricants; and antioxidants.

The carbon blacks can be exemplified by furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. These may be used alone or two or more of these may be used in combination.

The carbon black typically has a nitrogen adsorption specific surface area ($N_2SA$) of 5 to 200 $m^2/g$, and preferably a minimum $N_2SA$ of 50 $m^2/g$ and a maximum $N_2SA$ of 150 $m^2/g$. The carbon black typically has a dibutyl phthalate (DBP) absorption of 5 to 300 mL/100 g, and preferably a minimum DBP absorption of 80 mL/100 g and a maximum DBP adsorption of 180 mL/100 g. If the carbon black has a $N_2SA$ or DBP absorption of less than the lower limit of the range, the reinforcing effect is likely to be small, and the abrasion resistance tends to be reduced. If the $N_2SA$ or DBP absorption exceeds the upper limit of the range, the dispersibility is likely to be poor, and the hysteresis loss is likely to increase so that the fuel economy tends to be reduced. The nitrogen adsorption specific surface area is measured in accordance with ASTM D4820-93. The DBP absorption is measured in accordance with ASTM D2414-93. Applicable commercial products are available under the trade names SEAST 6, SEAST 7HM, and SEAST KH produced by Tokai Carbon Co., Ltd., CK3 and Special Black 4A produced by Evonik Degussa, and so forth.

In the case of adding carbon black to the rubber composition of the present invention, the amount of carbon black per 100 parts by mass of the rubber component is preferably 2 parts by mass or more. An amount of less than 2 parts by mass may fail to sufficiently achieve an effect producible by adding carbon black. The amount of carbon black is preferably 60 parts by mass or less, more preferably 20 parts by mass or less, and still more preferably 10 parts by mass or less. An amount of more than 60 parts by mass tends to deteriorate the fuel economy.

The extender oils can be exemplified by aromatic mineral oils (viscosity-gravity constant (VGC value)=0.900 to 1.049), naphthenic mineral oils (VGC value=0.850 to 0.899), and paraffinic mineral oils (VGC value=0.790 to 0.849). The polycyclic aromatic content of the extender oil is preferably less than 3% by mass, and more preferably less than 1% by mass. The polycyclic aromatic content is measured based on the British Institute of Petroleum method 346/92. Moreover, the aromatic compound content (CA) of the extender oil is preferably not less than 20% by mass. Two or more of these extender oils may be used in combination.

The vulcanization accelerators can be exemplified by thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, di-ortho-tolylguanidine, and ortho-tolylbiguanidine. The amount thereof used, expressed per 100 parts by mass of the rubber component, is preferably 0.1 to 5 parts by mass, and more preferably 0.2 to 3 parts by mass.

A known method can be used to mix the conjugated diene polymer with another rubber material, additives and so forth to prepare the rubber composition. For example, a method can be used in which the ingredients are kneaded using a known mixer, e.g., a roll mixer or a Banbury mixer.

With regard to the kneading conditions during the incorporation of additives other than vulcanizing agents and vulcanization accelerators, the kneading temperature is typically 50 to 200° C., preferably 80 to 190° C., and the kneading time is typically 30 seconds to 30 minutes, preferably 1 to 30 minutes.

During the incorporation of a vulcanizing agent and vulcanization accelerator, the kneading temperature is typically not more than 100° C. and is preferably in the range of room temperature to 80° C. The composition in which the vulcanizing agent and vulcanization accelerator have been incorporated is typically subjected to a vulcanizing treatment such as press vulcanization before use. The vulcanization temperature is typically 120 to 200° C., preferably 140 to 180° C.

The rubber composition of the present invention has an excellent balance among fuel economy, wet-grip performance, abrasion resistance, and kneading processability, and thus can provide a significant improvement in these properties.

The rubber composition of the present invention can be suitably used for various tire components and is particularly well suited for treads.

The pneumatic tire of the present invention can be produced by a usual method using the aforementioned rubber composition. Specifically, the rubber composition that incorporates various additives as necessary, before vulcanization, is extrusion processed into the shape of a tire tread, for example, and is then arranged by a usual method and assembled with other tire components in a tire building machine to form an unvulcanized tire. This unvulcanized tire is heat-pressed in a vulcanizer to produce a pneumatic tire of the present invention.

The pneumatic tire of the present invention can be suitably used as a tire for passenger vehicles and for trucks/buses (heavy-load tire).

EXAMPLES

The present invention is described by the following examples.

The physical properties were evaluated by the methods described below. In the physical property evaluations, Comparative Example 1 was considered as a standard comparative example in Table 5; Comparative Example 11 was considered as a standard comparative example in Tables 6 and 7; and Comparative Example 25 was considered as a standard comparative example in Table 8.

1. Vinyl Bond Content (Unit: Mol %)

The vinyl bond content of a polymer was determined by infrared spectroscopic analysis from the strength of the absorption in the vicinity of 910 $cm^{-2-}$, which is an absorption peak for a vinyl group.

2. Styrene Unit Content (Unit: % by Mass)

The styrene unit content of a polymer was determined from the refractive index according to JIS K6383 (1995).

3. Molecular Weight Distribution (Mw/Mn)

The weight-average molecular weight (Mw) and the number-average molecular weight (Mn) were measured by gel permeation chromatography (GPC) under the conditions (1) to (8) described below. The molecular weight distribution (Mw/Mn) of the polymer was determined from the measured Mw and Mn.

(1) instrument: HLC-8020 produced by Tosoh Corporation
(2) separation columns: 2×GMH-XL in series, produced by Tosoh Corporation
(3) measurement temperature: 40° C.
(4) carrier: tetrahydrofuran
(5) flow rate: 0.6 mL/minute
(6) quantity of injection: 5 μL
(7) detector: differential refractometer
(8) molecular weight standards: polystyrene standards 4. Tan δ

A strip test sample (width: 1 mm or 2 mm, length: 40 mm) was punched out of a vulcanized rubber composition sheet for testing. The tan δ of the test sample was determined with a spectrometer (produced by Ueshima Seisakusho Co., Ltd.) at a dynamic strain amplitude of 1%, a frequency of 10 Hz, and a temperature of 50° C. The reciprocal of the value of tan δ was expressed as an index relative to that in the standard comparative example regarded as 100. A larger index indicates a lower rolling resistance, which in turn indicates better fuel economy.

5. Rolling Resistance

The rolling resistance was measured using a rolling resistance tester by running a test tire with a 15×6JJ rim at an internal pressure of 230 kPa, a load of 3.43 kN, and a speed of 80 km/h. The obtained rolling resistance was expressed as an index relative to the rolling resistance in the standard comparative example regarded as 100. A larger index indicates a lower rolling resistance, which in turn indicates better fuel economy.

6. Wet-Grip Performance

The produced test tires were mounted on all the wheels of a vehicle (Japanese front engine front drive car, 2000 cc), and the braking distance with an initial speed of 100 km/h was measured on a wet asphalt road surface. Based on the equation below, the wet-skid performance (wet-grip performance) of the tires of each composition was expressed as an index relative to the wet-grip performance in the standard comparative example regarded as 100. A larger index indicates better wet-grip performance.

(Wet-grip performance index)=(Braking distance in standard comparative example)/(Braking distance of each composition)×100

7. Abrasion Resistance (LAT Abrasion Test)

The volume loss of each vulcanized rubber composition was measured with a LAT tester (Laboratory Abrasion and Skid Tester) at a load of 50 N, a speed of 20 km/h, and a slip angle of 5 degrees. The obtained volume loss of each composition was expressed as an index relative to the volume loss in the standard comparative example regarded as 100. A larger index indicates better abrasion resistance.

8. Kneading Processability

Materials other than sulfur and vulcanization accelerators were introduced at a predetermined filling rate and kneaded with a 1.7-L Banbury mixer from Kobe Steel, Ltd. for five minutes at 150° C. (starting temperature: 50° C.). The time period until the torque rises was measured, and the result was expressed as an index relative to the time period in the standard comparative example regarded as 100. A larger index indicates better kneading processability.

Production Example 1 (Synthesis of Polymer 1)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.1 mmol of 3-diethylaminopropyltriethoxysilane was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 1 was recovered from the polymer solution by steam stripping. Table 1 shows the evaluation results of Polymer 1. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 2 (Synthesis of Polymer 2)

The interior of a 5-L stainless steel polymerization reactor was washed and dried, and then replaced with dry nitrogen. Next, 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether were introduced into the polymerization reactor. Thereafter, 3.6 mmol of n-butyllithium in n-hexane was further introduced and the 1,3-butadiene and styrene were copolymerized for 2.5 hours. The polymerization was carried out under stirring at a rate of 130 rpm and a temperature within the polymerization reactor of 65° C. while the monomers were continuously fed into the polymerization reactor. The amount of 1,3-butadiene fed was 205 g, and the amount of styrene fed was 65 g.

After the 2.5-hour polymerization, 2.8 mmol of bis(diethylamino)methylvinylsilane in cyclohexane was introduced into the polymerization reactor under stirring at a rate of 130 rpm and a temperature within the polymerization reactor of 65° C., followed by stirring for 30 minutes.

Next, 20 mL of a hexane solution containing 0.14 mL of methanol was introduced into the polymerization reactor, and the polymer solution was stirred for 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 2 was recovered from the polymer solution by steam stripping. Table 1 shows the evaluation results of Polymer 2. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 3 (Synthesis of Polymer 3)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 3 was recovered from the polymer solution by steam stripping. Table 1 shows the evaluation results of Polymer 3. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 4 (Synthesis of Polymer 4)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 13.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.1 mmol of 3-diethylaminopropyltriethoxysilane was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 4 was recovered from the polymer solution by steam stripping. Table 1 shows the evaluation results of Polymer 4. Since the compound represented by formula (V) was not used in the synthesis of Polymer 4, Polymer 4 did not contain the constituent unit represented by formula (I).

Production Example 5 (Synthesis of Polymer 5)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 13.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 5 was recovered from the polymer solution by steam stripping. Table 1 shows the evaluation results of Polymer 5. Since the compound represented by formula (V) was not used in the synthesis of Polymer 5, Polymer 5 did not contain the constituent unit represented by formula (I).

Production Example 6 (Synthesis of Polymer 6)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.1 mmol of 3-diethylaminopropyltriethoxysilane was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g, of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 6 was obtained. Table 1 shows the evaluation results of Polymer 6. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

TABLE 1

|  | Polymer 1 | Polymer 2 | Polymer 3 | Polymer 4 | Polymer 5 | Polymer 6 |
|---|---|---|---|---|---|---|
| Styrene unit content (% by mass) | 25 | 25 | 24 | 25 | 24 | 25 |
| Vinyl bond content (mol %) | 59 | 59 | 60 | 59 | 58 | 60 |
| Molecular weight distribution (Mw/Mn) | 1.2 | 1.1 | 1.2 | 1.1 | 1.1 | 1.2 |

Production Example 7 (Synthesis of Polymer 7)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 14.9 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was stirred at a rate of 130 rpm, and 10.5 mmol of N-(3-dimethylaminopropyl)acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 7 was recovered from the polymer solution by steam stripping. Table 2 shows the evaluation results of Polymer 7. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 8 (Synthesis of Polymer 8)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 12.9 mmol of n-butyllithium in n-hexane was further introduced, and the 1,3-butadiene and styrene were copolymerized for 0.83 hours. The polymerization was carried out under stirring at a rate of 130 rpm and a temperature within the polymerization reactor of 65° C. while the monomers were continuously fed into the polymerization reactor.

After the 0.83-hour polymerization, 10.5 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 1.67 hours. The polymerization was carried out under stirring at a rate of 130 rpm and a temperature within the polymerization reactor of 65° C. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl)acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 8 was recovered from the polymer solution by steam stripping. Table 2 shows the evaluation results of Polymer 8. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 9 (Synthesis of Polymer 9)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 13.4 mmol of n-butyllithium in n-hexane were further introduced, and the 1,3-butadiene and styrene were copolymerized for one hour. The polymerization was carried out under stirring at a rate of 130 rpm and a temperature within the polymerization reactor of 65° C. while the monomers were continuously fed into the polymerization reactor.

After the polymerization, 10.5 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 0.5 hours. The polymerization was carried out under stirring at a rate of 130 rpm and a temperature within the polymerization reactor of 65° C.

After the 0.5-hour polymerization, 10.5 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 1.5 hours. The polymerization was carried out under stirring at a rate of 130 rpm and a temperature within the polymerization reactor of 65° C. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl)acrylamide was added thereto, followed by stirring for 15 minutes.

Then, 20 mL of a hexane solution containing 0.54 mL of methanol was added to the polymer solution, and the polymer solution was stirred for additional 5 minutes. To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 9 was recovered from the polymer solution by steam stripping. Table 2 shows the evaluation results of Polymer 9. The content of the constituent unit represented by formula (I) in the polymer, as calculated from the amounts of raw materials introduced and the amounts of raw materials fed into the polymerization reactor, was 0.017 mmol/g-polymer per unit mass of the polymer.

Production Example 10 (Synthesis of Polymer 10)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(di(n-butyl)amino)methylvinylsilane in cyclohexane and 13.4 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl) acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 10 was recovered from the polymer solution by steam stripping. Table 2 shows the evaluation results of Polymer 10. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 11 (Synthesis of Polymer 11)

The interior of a 5-L stainless steel polymerization reactor was washed and dried, and then replaced with dry nitrogen. Next, 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether were introduced into the polymerization reactor. Thereafter, 3.6 mmol of n-butyllithium in n-hexane was further introduced, and the 1,3-butadiene and styrene were copolymerized for 2.5 hours. The polymerization was carried out under stirring at a rate of 130 rpm and a temperature within the polymerization reactor of 65° C. while the monomers were continuously fed into the polymerization reactor. The amount of 1,3-butadiene fed was 205 g, and the amount of styrene fed was 65 g.

After the 2.5-hour polymerization, 2.8 mmol of bis(diethylamino)methylvinylsilane in cyclohexane was introduced into the polymerization reactor under stirring at a rate of 130 rpm and a temperature within the polymerization reactor of 65° C., followed by stirring for 30 minutes.

Next, 20 mL of a hexane solution containing 0.14 mL of methanol was introduced into the polymerization reactor, and the polymer solution was stirred for 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 11 was recovered from the polymer solution by steam stripping. Table 2 shows the evaluation results of Polymer 11. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 12 (Synthesis of Polymer 12)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 14.9 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 12 was recovered from the polymer solution by steam stripping. Table 2 shows the evaluation results of Polymer 12. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 13 (Synthesis of Polymer 13)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 14.9 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl) acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 13 was recovered from the polymer solution by steam stripping. Table 2 shows the evaluation results of Polymer 13. Since the compound represented by formula (V) was not used in the synthesis of Polymer 13, Polymer 13 did not contain the constituent unit represented by formula (I).

Production Example 14 (Synthesis of Polymer 14)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 14.9 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl) acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 14 was recovered from the polymer solution by steam stripping. Table 2 shows the evaluation results of Polymer 14. Since the compound represented by formula (V) was not used in the synthesis of Polymer 14, Polymer 14 did not contain the constituent unit represented by formula (I).

Production Example 15 (Synthesis of Polymer 15)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 14.9 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl) acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 15 was obtained. Table 2 shows the evaluation results of Polymer 15. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

TABLE 2

|  | Polymer 7 | Polymer 8 | Polymer 9 | Polymer 10 | Polymer 11 | Polymer 12 | Polymer 13 | Polymer 14 | Polymer 15 |
|---|---|---|---|---|---|---|---|---|---|
| Styrene unit content (% by mass) | 25 | 24 | 24 | 25 | 25 | 25 | 24 | 24 | 25 |
| Vinyl bond content (mol %) | 59 | 60 | 58 | 59 | 59 | 60 | 60 | 58 | 59 |
| Molecular weight distribution (Mw/Mn) | 1.2 | 1.1 | 1.1 | 1.3 | 1.1 | 1.2 | 1.1 | 1.1 | 1.2 |

Production Example 16 (Synthesis of Polymer 16)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.5 mmol of N,N-dimethylformamide dimethyl acetal was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 16 was recovered from the polymer solution by steam stripping. Table 3 shows the evaluation results of Polymer 16. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 17 (Synthesis of Polymer 17)

The interior of a 5-L stainless steel polymerization reactor was washed and dried, and then replaced with dry nitrogen. Next, 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether were introduced into the polymerization reactor. Thereafter, 3.6 mmol of n-butyllithium in n-hexane was further introduced, and the 1,3-butadiene and styrene were copolymerized for 2.5 hours. The polymerization was carried out under stirring at a rate of 130 rpm and a temperature within the polymerization reactor of 65° C. while the monomers were continuously fed into the polymerization reactor. The amount of 1,3-butadiene fed was 205 g, and the amount of styrene fed was 65 g.

After the 2.5-hour polymerization, 2.8 mmol of bis(diethylamino)methylvinylsilane in cyclohexane was introduced into the polymerization reactor under stirring at a rate of 130 rpm and a temperature within the polymerization reactor of 65° C., followed by stirring for 30 minutes. Next, 20 mL of a hexane solution containing 0.14 mL of methanol was introduced into the polymerization reactor, and the polymer solution was stirred for 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 17 was recovered from the polymer solution by steam stripping. Table 3 shows the evaluation results of Polymer 17. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 18 (Synthesis of Polymer 18)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 18 was recovered from the polymer solution by steam stripping. Table 3 shows the evaluation results of Polymer 18. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 19 (Synthesis of Polymer 19)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 13.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.5 mmol of N,N-dimethylformamide dimethyl acetal was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 19 was recovered from the polymer solution by steam stripping. Table 3 shows the evaluation results of Polymer 19. Since the compound represented by formula (V) was not used in the synthesis of Polymer 19, Polymer 19 did not contain the constituent unit represented by formula (I).

Production Example 20 (Synthesis of Polymer 20)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 13.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 21 was obtained. Table 3 shows the evaluation results of Polymer 21. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

TABLE 3

|  | Polymer 16 | Polymer 17 | Polymer 18 | Polymer 19 | Polymer 20 | Polymer 21 |
|---|---|---|---|---|---|---|
| Styrene unit content (% by mass) | 25 | 25 | 24 | 25 | 24 | 25 |
| Vinyl bond content (mol %) | 59 | 59 | 60 | 59 | 58 | 60 |
| Molecular weight distribution (Mw/Mn) | 1.2 | 1.1 | 1.2 | 1.1 | 1.1 | 1.2 |

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 20 was recovered from the polymer solution by steam stripping. Table 3 shows the evaluation results of Polymer 20. Since the compound represented by formula (V) was not used in the synthesis of Polymer 20, Polymer 20 did not contain the constituent unit represented by formula (I).

Production Example 21 (Synthesis of Polymer 21)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.5 mmol of N,N-dimethylformamide dimethyl acetal was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of The chemicals used in examples and comparative examples are described below.
BR 1: Ubepol BR150B produced by Ube Industries, Ltd.
BR 2: Ubepol BR150L produced by Ube Industries, Ltd.
BR 3: Ubepol BR230 produced by Ube Industries, Ltd.
BR 4: Ubepol BR710 produced by Ube Industries, Ltd. (high-cis polybutadiene rubber produced by the method described in JP 4124273 B)
Polymers 1 to 21: see Production Examples 1 to 21 above
Silica: Ultrasil VN3-G (N$_2$SA: 175 m$^2$/g) produced by Evonik Degussa
Silane coupling agent: Si69 (bis(3-triethoxysilylpropyl)tetrasulfide) produced by Evonik Degussa
Carbon black: Diablack N220 (N$_2$SA: 114 m$^2$/g, DBP absorption: 114 mL/100 g) produced by Mitsubishi Chemical Corporation
Oil: X-140 produced by JX Nippon Oil & Energy Corporation
Antioxidant: Antigene 3C produced by Sumitomo Chemical Co., Ltd.
Stearic acid: stearic acid beads "Tsubaki" produced by NOF Corporation
Zinc oxide: zinc white #1 produced by Mitsui Mining & Smelting Co., Ltd.
Wax: Sunnoc N produced by Ouchi Shinko Chemical Industrial Co., Ltd.
Sulfur: sulfur powder produced by Tsurumi Chemical Industry Co., Ltd.
Vulcanization accelerator 1: Soxinol CZ produced by Sumitomo Chemical Co., Ltd.
Vulcanization accelerator 2: Soxinol D produced by Sumitomo Chemical Co., Ltd.

The results of analyses on the BRs 1 to 4 by the aforementioned methods are collectively shown in Table 4. The BR 4 corresponds to the aforementioned high-cis polybutadiene.

TABLE 4

|  | BR 1 BR150B | BR 2 BR150L | BR 3 BR230 | BR 4 BR710 |
|---|---|---|---|---|
| ML | 40 | 40 | 38 | 43 |
| Mw/Mn | 3.2 | 2.3 | 4.5 | 3.2 |
| Mw (×10$^4$) | 50 | 51 | 63 | 55 |

TABLE 4-continued

|  | BR 1 BR150B | BR 2 BR150L | BR 3 BR230 | BR 4 BR710 |
|---|---|---|---|---|
| n | 4.2 | 2.1 | 3.1 | 2.5 |
| Cis content (% by mass) | 97 | 98 | 98 | 98 |
| Tcp | 48 | 97 | 117 | 118 |
| Tcp/ML | 1.2 | 2.4 | 3.1 | 2.7 |

Examples and Comparative Examples

According to each formulation shown in Tables 5 to 8, the materials other than the sulfur and vulcanization accelerators were kneaded for 5 minutes at 150° C. (starting temperature: 50° C.) using a 1.7-L Banbury mixer from Kobe Steel, Ltd., to obtain a kneadate. The sulfur and vulcanization accelerators were then added to the obtained kneadate and kneading was performed using an open roll mill for 5 minutes at 80° C. to obtain an unvulcanized rubber composition. The obtained unvulcanized rubber composition was press-vulcanized for 20 minutes at 170° C. using a 0.5 mm-thick mold to obtain a vulcanized rubber composition.

In addition, the unvulcanized rubber composition was formed into a tread shape and assembled with other tire components in a tire building machine to form an unvulcanized tire. The unvulcanized tire was vulcanized for 12 minutes at 170° C. to prepare a test tire (size: 195/65R15).

The obtained vulcanized rubber compositions, and test tires were evaluated by the aforementioned testing methods. Tables 5 to 8 show the results of these tests.

TABLE 5

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
| Blending amount (parts by mass) | BR 1 (BR150B) | — | — | — | — | 30 | — | 30 | 30 |
|  | BR 2 (BR150L) | — | — | — | — | — | — | — | — |
|  | BR 3 (BR230) | — | — | — | — | — | — | — | — |
|  | BR 4 (BR710) | 30 | 15 | 45 | 30 | — | 30 | — | — |
|  | Polymer 1 | 70 | 85 | 55 | — | — | — | — | — |
|  | Polymer 2 | — | — | — | — | — | — | 70 | — |
|  | Polymer 3 | — | — | — | — | — | — | — | 70 |
|  | Polymer 4 | — | — | — | — | — | — | — | — |
|  | Polymer 5 | — | — | — | — | 70 | 70 | — | — |
|  | Polymer 6 | — | — | — | 70 | — | — | — | — |
|  | Silica | 75 | 75 | 75 | 75 | 75 | 75 | 75 | 75 |
|  | Silane coupling agent | 6 | 6 | 6 | 6 | 6 | 6 | 6 | 6 |
|  | Carbon black | 5 | 5 | 5 | 5 | 5 | 5 | 5 | 5 |
|  | Oil | 20 | 20 | 20 | 20 | 20 | 20 | 20 | 20 |
|  | Antioxidant | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 |
|  | Wax | 1 | 1 | 1 | 1 | 1 | 1 | 1 | 1 |
|  | Sulfur | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 |
| Evaluation | tan δ | 105 | 100 | 104 | 102 | 100 | 74 | 85 | 88 |
|  | Rolling resistance | 103 | 100 | 106 | 100 | 100 | 74 | 80 | 82 |
|  | Wet-grip performance | 105 | 105 | 98 | 102 | 100 | 76 | 84 | 86 |
|  | Abrasion resistance | 121 | 103 | 131 | 118 | 100 | 106 | 92 | 96 |
|  | Kneading processability | 128 | 118 | 109 | 126 | 100 | 115 | 98 | 102 |

|  |  | Comparative Example 5 | Comparative Example 6 | Comparative Example 7 | Comparative Example 8 | Comparative Example 9 | Comparative Example 10 |
|---|---|---|---|---|---|---|---|
| Blending amount (parts by mass) | BR 1 (BR150B) | 30 | — | — | — | — | 30 |
|  | BR 2 (BR150L) | — | 30 | — | — | — | — |
|  | BR 3 (BR230) | — | — | 30 | — | — | — |
|  | BR 4 (BR710) | — | — | — | 5 | 75 | — |
|  | Polymer 1 | — | 70 | 70 | 95 | 25 | 70 |
|  | Polymer 2 | — | — | — | — | — | — |
|  | Polymer 3 | — | — | — | — | — | — |
|  | Polymer 4 | 70 | — | — | — | — | — |
|  | Polymer 5 | — | — | — | — | — | — |
|  | Polymer 6 | — | — | — | — | — | — |
|  | Silica | 75 | 75 | 75 | 75 | 75 | 75 |
|  | Silane coupling agent | 6 | 6 | 6 | 6 | 6 | 6 |
|  | Carbon black | 5 | 5 | 5 | 5 | 5 | 5 |
|  | Oil | 20 | 20 | 20 | 20 | 20 | 20 |
|  | Antioxidant | 1.5 | 1.5 | 1.5 | 1.5 | 1.5 | 1.5 |
|  | Stearic acid | 2 | 2 | 2 | 2 | 2 | 2 |
|  | Zinc oxide | 2.5 | 2.5 | 2.5 | 2.5 | 2.5 | 2.5 |
|  | Wax | 1 | 1 | 1 | 1 | 1 | 1 |
|  | Sulfur | 2 | 2 | 2 | 2 | 2 | 2 |

TABLE 5-continued

|  |  |  |  |  |  |  |  |
|---|---|---|---|---|---|---|---|
|  | Vulcanization accelerator 1 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 |
| Evaluation | tan δ | 89 | 98 | 98 | 83 | 122 | 103 |
|  | Rolling resistance | 82 | 96 | 96 | 82 | 128 | 102 |
|  | Wet-grip performance | 89 | 92 | 92 | 112 | 63 | 103 |
|  | Abrasion resistance | 94 | 99 | 98 | 77 | 126 | 101 |
|  | Kneading processability | 103 | 98 | 119 | 98 | 104 | 114 |

As shown in Table 5, the fuel economy, wet-grip performance, abrasion resistance, and kneading processability were improved in a balanced manner in the examples in each of which the rubber composition included a specific amount of silica, and a rubber component containing a specific amount of a specific high-cis polybutadiene (BR 4) and a specific amount of a specific conjugated diene polymer (polymer 1 or 6).

In contrast, in Comparative Example 1 in which a BR other than the specific high-cis polybutadiene and an unmodified SBR were used, the properties were overall inferior to those in the examples. Also, in Comparative Example 2 in which the specific high-cis polybutadiene (BR 4) and an unmodified SBR were used, the fuel economy and wet-grip performance were significantly inferior to those in the examples. Moreover, in Comparative Example 10 in which a BR other than the specific high-cis polybutadiene and the specific conjugated diene polymer (polymer 1) were used, all the properties were inferior to those in Example 1. The results in Comparative Examples 1, 2 and 10, and Example 1 show that the fuel economy, wet-grip performance, and abrasion resistance can be synergically improved when the specific high-cis polybutadiene and the specific conjugated diene polymer are used in combination.

In Comparative Examples 3 to 5 in each of which a BR other than the specific high-cis polybutadiene and a modified SBR other than the specific conjugated diene polymer were used, the fuel economy, wet-grip performance, abrasion resistance, and kneading processability were significantly inferior to those in the examples.

In Comparative Examples 6 and 7 in each of which a BR other than the specific high-cis polybutadiene and the specific conjugated diene polymer (polymer 1) were used, the fuel economy, wet-grip performance, abrasion resistance, and kneading processability were inferior to those in the examples.

In Comparative Examples 8 and 9, the specific high-cis polybutadiene (BR 4) and the specific conjugated diene polymer (polymer 1) were used but not in the specific amounts. In Comparative Example 8 in which the amount of BR 4 was smaller and the amount of the polymer 1 was larger than the specific amounts, the fuel economy and abrasion resistance were significantly inferior to those in the examples. In Comparative Example 9 in which the amount of BR 4 was larger and the amount of the polymer 1 was smaller than the specific amounts, the wet-grip performance was significantly inferior to that in the examples.

TABLE 6

|  |  | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|
| Blending amount (parts by mass) | BR 1 (BR150B) | 30 | 30 | 30 | 30 | — | — | — | — |
|  | BR 2 (BR150L) | — | — | — | — | — | — | — | — |
|  | BR 3 (BR230) | — | — | — | — | — | — | — | — |
|  | BR 4 (BR710) | — | — | — | — | 30 | 30 | 30 | 30 |
|  | Polymer 7 | — | — | — | — | — | — | — | — |
|  | Polymer 8 | — | — | — | — | — | — | — | — |
|  | Polymer 9 | — | — | — | — | — | — | — | — |
|  | Polymer 10 | — | — | — | — | — | — | — | — |
|  | Polymer 11 | — | 70 | — | — | — | 70 | — | — |
|  | Polymer 12 | — | — | 70 | — | — | — | 70 | — |
|  | Polymer 13 | — | — | — | 70 | — | — | — | 70 |
|  | Polymer 14 | 70 | — | — | — | 70 | — | — | — |
|  | Polymer 15 | — | — | — | — | — | — | — | — |
|  | Silica | 75 | 75 | 75 | 75 | 75 | 75 | 75 | 75 |
|  | Silane coupling agent | 6 | 6 | 6 | 6 | 6 | 6 | 6 | 6 |
|  | Carbon black | 5 | 5 | 5 | 5 | 5 | 5 | 5 | 5 |
|  | Oil | 20 | 20 | 20 | 20 | 20 | 20 | 20 | 20 |
|  | Antioxidant | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 |
|  | Wax | 1 | 1 | 1 | 1 | 1 | 1 | 1 | 1 |
|  | Sulfur | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 |

TABLE 6-continued

| Evaluation | tan δ | 100 | 115 | 120 | 121 | 102 | 118 | 121 | 123 |
|---|---|---|---|---|---|---|---|---|---|
| | Rolling resistance | 100 | 109 | 111 | 113 | 103 | 116 | 123 | 124 |
| | Wet-grip performance | 100 | 118 | 121 | 122 | 100 | 119 | 120 | 120 |
| | Abrasion resistance | 100 | 109 | 110 | 112 | 111 | 121 | 122 | 125 |
| | Kneading processability | 100 | 100 | 98 | 102 | 105 | 104 | 102 | 106 |

| | | | Comparative Example 19 | Comparative Example 20 | Comparative Example 21 | Comparative Example 22 | Comparative Example 23 | Comparative Example 24 |
|---|---|---|---|---|---|---|---|---|
| Blending amount (parts by mass) | | BR 1 (BR150B) | 30 | — | — | — | — | — |
| | | BR 2 (BR150L) | — | 30 | — | — | — | — |
| | | BR 3 (BR230) | — | — | 30 | — | — | — |
| | | BR 4 (BR710) | — | — | — | 5 | 75 | 30 |
| | | Polymer 7 | 70 | 70 | 70 | 95 | 25 | 25 |
| | | Polymer 8 | — | — | — | — | — | — |
| | | Polymer 9 | — | — | — | — | — | — |
| | | Polymer 10 | — | — | — | — | — | — |
| | | Polymer 11 | — | — | — | — | — | 45 |
| | | Polymer 12 | — | — | — | — | — | — |
| | | Polymer 13 | — | — | — | — | — | — |
| | | Polymer 14 | — | — | — | — | — | — |
| | | Polymer 15 | — | — | — | — | — | — |
| | | Silica | 75 | 75 | 75 | 75 | 75 | 75 |
| | | Silane coupling agent | 6 | 6 | 6 | 6 | 6 | 6 |
| | | Carbon black | 5 | 5 | 5 | 5 | 5 | 5 |
| | | Oil | 20 | 20 | 20 | 20 | 20 | 20 |
| | | Antioxidant | 1.5 | 1.5 | 1.5 | 1.5 | 1.5 | 1.5 |
| | | Stearic acid | 2 | 2 | 2 | 2 | 2 | 2 |
| | | Zinc oxide | 2.5 | 2.5 | 2.5 | 2.5 | 2.5 | 2.5 |
| | | Wax | 1 | 1 | 1 | 1 | 1 | 1 |
| | | Sulfur | 2 | 2 | 2 | 2 | 2 | 2 |
| | | Vulcanization accelerator 1 | 1.8 | 1.8 | 1.8 | 1.8 | 1.8 | 1.8 |
| | | Vulcanization accelerator 2 | 1.2 | 1.2 | 1.2 | 1.2 | 1.2 | 1.2 |
| | Evaluation | tan δ | 139 | 134 | 134 | 119 | 158 | 121 |
| | | Rolling resistance | 136 | 130 | 130 | 118 | 162 | 122 |
| | | Wet-grip performance | 139 | 137 | 136 | 148 | 110 | 123 |
| | | Abrasion resistance | 120 | 123 | 121 | 104 | 164 | 126 |
| | | Kneading processability | 103 | 102 | 104 | 97 | 95 | 110 |

TABLE 7

| | | Example 5 | Example 6 | Example 7 | Example 8 | Example 9 | Example 10 | Example 11 | Example 12 |
|---|---|---|---|---|---|---|---|---|---|
| Blending amount (parts by mass) | BR 1 (BR150B) | — | — | — | — | — | — | — | — |
| | BR 2 (BR150L) | — | — | — | — | — | — | — | — |
| | BR 3 (BR230) | — | — | — | — | — | — | — | — |
| | BR 4 (BR710) | 30 | 15 | 45 | 30 | 30 | 30 | 30 | 30 |
| | Polymer 7 | 70 | 85 | 55 | — | — | — | 70 | — |
| | Polymer 8 | — | — | — | 70 | — | — | — | — |
| | Polymer 9 | — | — | — | — | 70 | — | — | — |
| | Polymer 10 | — | — | — | — | — | 70 | — | — |
| | Polymer 11 | — | — | — | — | — | — | — | — |
| | Polymer 12 | — | — | — | — | — | — | — | — |
| | Polymer 13 | — | — | — | — | — | — | — | — |
| | Polymer 14 | — | — | — | — | — | — | — | — |
| | Polymer 15 | — | — | — | — | — | — | — | 70 |
| | Silica | 75 | 75 | 75 | 75 | 75 | 75 | 50 | 75 |
| | Silane coupling agent | 6 | 6 | 6 | 6 | 6 | 6 | 4 | 6 |
| | Carbon black | 5 | 5 | 5 | 5 | 5 | 5 | 5 | 5 |
| | Oil | 20 | 20 | 20 | 20 | 20 | 20 | 5 | 20 |
| | Antioxidant | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 |
| | Wax | 1 | 1 | 1 | 1 | 1 | 1 | 1 | 1 |

TABLE 7-continued

|  |  | Example 5 | Example 6 | Example 7 | Example 8 | Example 9 | Example 10 | Example 11 | Example 12 |
|---|---|---|---|---|---|---|---|---|---|
|  | Sulfur | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 |
| Evaluation | tan δ | 145 | 142 | 146 | 146 | 151 | 151 | 145 | 135 |
|  | Rolling resistance | 143 | 142 | 148 | 144 | 147 | 148 | 146 | 139 |
|  | Wet-grip performance | 142 | 145 | 138 | 143 | 145 | 147 | 142 | 130 |
|  | Abrasion resistance | 135 | 125 | 153 | 136 | 141 | 143 | 134 | 129 |
|  | Kneading processability | 118 | 114 | 114 | 107 | 105 | 106 | 120 | 115 |

Tables 6 and 7 show that in the examples in each of which the rubber composition included a specific amount of silica, and a rubber component containing a specific amount of a specific high-cis polybutadiene (BR 4) and a specific amount of a specific conjugated diene polymer (polymer 7 to 10, or 15), the fuel economy, wet-grip performance, abrasion resistance, and kneading processability were improved in a balanced manner as compared with the comparative examples.

The results in Comparative Examples 11, 15 and 19, and Example 5 show that the fuel economy, wet-grip performance, abrasion resistance, and kneading processability (in particular, kneading processability) can be synergically improved when the specific high-cis polybutadiene and the specific conjugated diene polymer are used in combination.

Comparison between Comparative Examples 11, 13, 15, and 17 shows that the combination use of the specific high-cis polybutadiene with a styrenebutadiene rubber (polymer 12) modified only at the main chain does not synergically enhance the wet-grip performance, abrasion resistance, and kneading processability. In Comparative Example 17 in which the specific high-cis polybutadiene and the polymer 12 were used in combination, the properties were significantly inferior to those in the examples. Similarly, comparison between Comparative Examples 11, 14, 15, and 18 shows that the combination use of the specific high-cis polybutadiene with a styrenebutadiene rubber (polymer 13) modified only at the terminal does not synergically enhance the wet-grip performance, abrasion resistance, and kneading processability. In Comparative Example 18 in which the specific high-cis polybutadiene and the polymer 13 were used in combination, the properties were significantly inferior to those in the examples.

In Comparative Examples 19 to 21 in each of which a BR other than the specific high-cis polybutadiene and the specific conjugated polymer were used in combination, the properties were significantly inferior to those in the examples.

Comparisons between Comparative Example 11 and Comparative Example 15, between Comparative Example 12 and Comparative Example 16, between Comparative Example 13 and Comparative Example 17, and between Comparative Example 14 and Comparative Example 18 show that the combination use of the specific high-cis polybutadiene, in place of BR 1, and an unmodified styrene butadiene rubber, styrene butadiene rubber modified only at the terminal, or styrene butadiene rubber modified only at the main chain does not produce an effect of improving the wet-grip performance.

TABLE 8

|  |  | Example 13 | Example 14 | Example 15 | Example 16 | Example 17 | Comparative Example 25 | Comparative Example 26 | Comparative Example 27 | Comparative Example 28 |
|---|---|---|---|---|---|---|---|---|---|---|
| Blending amount (parts by mass) | BR 1 (BR150B) | — | — | — | — | — | 30 | — | — | — |
|  | BR 2 (BR150L) | — | — | — | — | — | — | — | — | — |
|  | BR 3 (BR230) | — | — | — | — | — | — | — | — | — |
|  | BR 4 (BR710) | 30 | 15 | 45 | 30 | 60 | — | 30 | 30 | 30 |
|  | Polymer 16 | 70 | 85 | 55 | — | 40 | — | — | — | — |
|  | Polymer 17 | — | — | — | — | — | — | — | 70 | — |
|  | Polymer 18 | — | — | — | — | — | — | — | — | 70 |
|  | Polymer 19 | — | — | — | — | — | — | — | — | — |
|  | Polymer 20 (unmodified) | — | — | — | — | — | 70 | 70 | — | — |
|  | Polymer 21 | — | — | — | 70 | — | — | — | — | — |
|  | Silica | 75 | 75 | 75 | 75 | 75 | 75 | 75 | 75 | 75 |
|  | Silane coupling agent | 6 | 6 | 6 | 6 | 6 | 6 | 6 | 6 | 6 |
|  | Carbon black | 5 | 5 | 5 | 5 | 5 | 5 | 5 | 5 | 5 |
|  | Oil | 20 | 20 | 20 | 20 | 20 | 20 | 20 | 20 | 20 |
|  | Antioxidant | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 |
|  | Sulfur | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 |
| Evaluation | tan δ | 132 | 136 | 121 | 123 | 120 | 100 | 108 | 105 | 104 |
|  | Rolling resistance | 135 | 134 | 119 | 120 | 118 | 100 | 106 | 104 | 105 |

TABLE 8-continued

|  |  | | | | | | | | |
|---|---|---|---|---|---|---|---|---|---|
| Wet-grip performance | | 123 | 129 | 116 | 118 | 117 | 100 | 101 | 102 | 108 |
| Abrasion resistance | | 119 | 114 | 143 | 113 | 150 | 100 | 109 | 106 | 105 |
| Kneading processability | | 120 | 118 | 115 | 114 | 108 | 100 | 105 | 104 | 102 |

| | | | Comparative Example 29 | Comparative Example 30 | Comparative Example 31 | Comparative Example 32 | Comparative Example 33 | Comparative Example 34 |
|---|---|---|---|---|---|---|---|---|
| Blending amount (parts by mass) | BR 1 (BR150B) | — | — | — | 30 | — | — |
| | BR 2 (BR150L) | — | 30 | — | — | — | — |
| | BR 3 (BR230) | — | — | 30 | — | — | — |
| | BR 4 (BR710) | 30 | — | — | — | 5 | 75 |
| | Polymer 16 | — | 70 | 70 | 70 | 95 | 25 |
| | Polymer 17 | — | — | — | — | — | — |
| | Polymer 18 | — | — | — | — | — | — |
| | Polymer 19 | 70 | — | — | — | — | — |
| | Polymer 20 (unmodified) | — | — | — | — | — | — |
| | Polymer 21 | — | — | — | — | — | — |
| | Silica | 75 | 75 | 75 | 75 | 75 | 75 |
| | Silane coupling agent | 6 | 6 | 6 | 6 | 6 | 6 |
| | Carbon black | 5 | 5 | 5 | 5 | 5 | 5 |
| | Oil | 20 | 20 | 20 | 20 | 20 | 20 |
| | Antioxidant | 1.5 | 1.5 | 1.5 | 1.5 | 1.5 | 1.5 |
| | Stearic acid | 2 | 2 | 2 | 2 | 2 | 2 |
| | Zinc oxide | 2.5 | 2.5 | 2.5 | 2.5 | 2.5 | 2.5 |
| | Wax | 1 | 1 | 1 | 1 | 1 | 1 |
| | Sulfur | 2 | 2 | 2 | 2 | 2 | 2 |
| | Vulcanization accelerator 1 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 |
| Evaluation | tan δ | 102 | 112 | 111 | 109 | 114 | 103 |
| | Rolling resistance | 101 | 110 | 111 | 108 | 112 | 104 |
| | Wet-grip performance | 100 | 108 | 108 | 105 | 109 | 99 |
| | Abrasion resistance | 112 | 96 | 100 | 104 | 102 | 115 |
| | Kneading processability | 107 | 103 | 99 | 101 | 98 | 90 |

As shown in Table 8, in the examples in each of which the rubber composition included a specific high-cis polybutadiene (BR 4), a specific conjugated diene polymer (polymer 16 or 21), and silica, the fuel economy, wet-grip performance, abrasion resistance, and kneading processability were improved in a balanced manner as compared with the comparative examples. In particular, comparison between Example 13, and Comparative Examples 25, 26, and 32 clearly shows that the combination use of the specific high-cis polybutadiene (BR 4) and the specific conjugated diene polymer (polymer 16 or 21) can synergically enhance the fuel economy, wet-grip performance, abrasion resistance and kneading processability.

The invention claimed is:

1. A rubber composition, comprising a rubber component and silica,
   wherein the rubber component contains, based on 100% by mass of the rubber component,
   10 to 70% by mass of a high-cis polybutadiene having a cis content of 95% by mass or more and satisfying the following requirements (A) to (C): (A) a Mooney viscosity (ML) of 40 to 49; (B) a molecular weight distribution (weight-average molecular weight (Mw)/number-average molecular weight (Mn)) of 3.0 to 3.9; and (C) an index (n-value in Expression (1) below) of velocity dependence of Mooney viscosity of 2.3 to 3.0, and
   30 to 90% by mass of a conjugated diene polymer containing a constituent unit based on a conjugated diene and a constituent unit represented by formula (I) below, at least one terminal of the polymer being modified with at least one compound selected from the group consisting of a compound represented by formula (II) below, a compound represented by formula (III) below, and a compound represented by formula (IVa) below, and
   an amount of the silica is 5 to 150 parts by mass per 100 parts by mass of the rubber component, $$\log(ML) = \log(K) + n^{-1} \times \log(RS) \quad \text{(Expression 1)}$$

wherein RS indicates the number of revolutions per minute of a rotor, K indicates an arbitrary number, and ML indicates a Mooney viscosity,

wherein $X^1$, $X^2$, and $X^3$ each independently represent a hydroxyl group or a $C_{1-4}$ alkyl group, and two of $X^1$, $X^2$, and $X^3$ are hydroxyl groups;

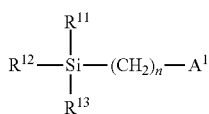
(II)

wherein n represents an integer of 1 to 10; $R^{11}$, $R^{12}$, and $R^{13}$ each independently represent a $C_{1-4}$ alkyl group or a $C_{1-4}$ alkoxy group, and at least one of $R^{11}$, $R^{12}$, and $R^{13}$ is an alkoxy group; and $A^1$ is a group represented by the formula (IIa):

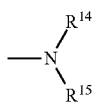
(IIa)

wherein $R^{14}$ and $R^{15}$ each independently represent a $C_{1-6}$ alkyl group, a $C_{1-6}$ alkylene oxide group, a $C_{1-6}$ alkylene oxide alkyl group, or a $C_{1-6}$ trialkylsilyl group;

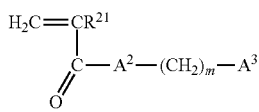
(III)

wherein m represents an integer of 1 to 10; $R^{21}$ represents a hydrogen atom, a $C_{1-6}$ alkyl group, or a $C_{1-6}$ alkoxyalkyl group; $A^2$ represents the following group: —$NR^{22}$— where $R^{22}$ represents a hydrogen atom or a $C_{1-4}$ alkyl group; and $A^3$ is a group represented by the formula (IIIa):

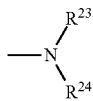
(IIIa)

wherein $R^{23}$ and $R^{24}$ each independently represent a $C_{1-6}$ alkyl group, a $C_{1-6}$ alkylene oxide group, a $C_{1-6}$ alkylene oxide alkyl group, or a $C_{1-6}$ trialkylsilyl group;

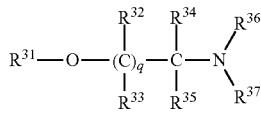
(IVa)

wherein q represents an integer of 0 to 10; $R^{31}$ represents a $C_{1-5}$ alkyl group; $R^{32}$, $R^{33}$, $R^{34}$ and $R^{35}$ each independently represent a hydrogen atom, a $C_{1-5}$ alkyl group, a $C_{1-5}$ alkoxyalkyl group, or a $C_{1-5}$ alkoxy group, and when a plurality of $R^{32}$'s and a plurality of $R^{33}$'s are present, the plurality of $R^{32}$'s and the plurality of $R^{33}$'s may be the same as or different from one another; and $R^{36}$ and $R^{37}$ each independently represent a $C_{1-6}$ alkyl group.

2. The rubber composition according to claim 1, wherein one of $R^{34}$ and $R^{35}$ in formula (IVa) is a hydrogen atom.

3. The rubber composition according to claim 1, wherein the conjugated diene polymer has a vinyl bond content of at least 10 mol % but not more than 80 mol % per 100 mol % of the constituent unit based on a conjugated diene.

4. The rubber composition according to claim 1, wherein the high-cis polybutadiene has a ratio (Tcp/ML) of a 5% by mass toluene solution viscosity (Tcp) to the Mooney viscosity (ML) of 2.5 to 3.5.

5. The rubber composition according to claim 1, wherein the high-cis polybutadiene has a Mw of 500,000 to 700,000 and a Mn of 120,000 to 250,000.

6. The rubber composition according to claim 1, wherein the silica has a nitrogen adsorption specific surface area of 40 to 400 m²/g.

7. The rubber composition according to claim 1, which is for use as a rubber composition for a tread.

8. A pneumatic tire, produced using the rubber composition according to claim 1.

* * * * *